(12) United States Patent
Kikuchi

(10) Patent No.: US 10,546,219 B2
(45) Date of Patent: Jan. 28, 2020

(54) PRINTING SYSTEM, PRINTING APPARATUS, PRINTING CONTROL APPARATUS, AND CONTROL METHOD OF PRINTING SYSTEM

(71) Applicant: CANON KABUSHIKI KAISHA, Tokyo (JP)

(72) Inventor: Shou Kikuchi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/703,864

(22) Filed: Sep. 13, 2017

(65) Prior Publication Data
US 2018/0005093 A1 Jan. 4, 2018

Related U.S. Application Data

(63) Continuation of application No. 14/327,457, filed on Jul. 9, 2014, now Pat. No. 9,792,538.

(30) Foreign Application Priority Data

Jul. 12, 2013 (JP) .................................. 2013-146311

(51) Int. Cl.
*G06K 15/02* (2006.01)
*G06F 3/12* (2006.01)

(52) U.S. Cl.
CPC ....... *G06K 15/1848* (2013.01); *G06F 3/1204* (2013.01); *G06F 3/1226* (2013.01); *G06F 3/1229* (2013.01); *G06F 3/1288* (2013.01)

(58) Field of Classification Search
CPC . G06K 15/1848; G06F 3/1204; G06F 3/1226; G06F 3/1229; G06F 3/1288
USPC ........................................ 358/3.24, 1.15, 1.9
See application file for complete search history.

(56) References Cited

U.S. PATENT DOCUMENTS

| | | | |
|---|---|---|---|
| 2010/0118336 A1* | 5/2010 | Oshima ................. | G06F 3/1204 358/1.15 |
| 2013/0135677 A1* | 5/2013 | Ota ....................... | G06F 3/1296 358/1.15 |

\* cited by examiner

*Primary Examiner* — Quang N Vo
(74) *Attorney, Agent, or Firm* — Canon U.S.A., Inc. IP Division

(57) ABSTRACT

A printing system includes a printing apparatus and a printing control apparatus. The printing apparatus obtains stored first attribute information of a sheet, and sends the obtained first attribute information to the printing control apparatus. The printing control apparatus includes an information storing unit and a first and second receiving unit. The information storing unit stores first and second attribute information of sheets. The first receiving unit receives first attribute information and the second sending unit reads sheet candidates corresponding to the received first attribute information and sends the sheet candidates to the printing apparatus. The printing apparatus further receives the received sheet candidates, displays the received sheet candidates, selects sheet information from the displayed sheet candidates, and sets the second attribute information of a selected sheet as attribute information of a sheet to be stored.

18 Claims, 21 Drawing Sheets

FIG. 8

REGISTRATION SCREEN 801

| NAME | SIZE | GRAMMAGE | COLOR | TYPE |
|---|---|---|---|---|
| Media1 | A4 | 62g/m2 | Red | PLAIN PAPER |
| Media2 | A4 | 80g/m2 | Yellow | PLAIN PAPER |
| Media3 | A3 | 128g/m2 | White | CARDBOARD |
| MediaEx | A4 | 62g/m2 | White | PLAIN PAPER |
| Paper1 | A4 | 150g/m2 | White | CARDBOARD |
| Paper2 | A4 | 64g/m2 | Blue | COATED PAPER |
| Paper3 | A3 | 80g/m2 | White | PLAIN PAPER |
| MyPaper | B4 | 100g/m2 | Yellow | TAB SHEET |
| ... | ... | ... | ... | ... |

FIG. 9

SHEET HOLDING UNIT REGISTRATION SCREEN — 901

| SHEET HOLDING UNIT | NAME | SIZE | GRAMMAGE | COLOR | TYPE |
|---|---|---|---|---|---|
| Tray1 | Media1 | A4 | 62g/m2 | Red | PLAIN PAPER |
| | Media2 | A4 | 80g/m2 | Yellow | PLAIN PAPER |
| | Paper1 | A4 | 150g/m2 | White | CARDBOARD |
| | Paper2 | A4 | 64g/m2 | Blue | COATED PAPER |
| | Paper3 | A3 | 80g/m2 | White | PLAIN PAPER |
| Tray2 | MediaEX | A4 | 62g/m2 | White | PLAIN PAPER |
| | Paper3 | A3 | 80g/m2 | White | PLAIN PAPER |
| | Media3 | A3 | 128g/m2 | White | CARDBOARD |
| ... | ... | ... | ... | ... | ... |

FIG. 14

CANDIDATE LIST SCREEN 1401

| NAME   | SIZE | GRAMMAGE  | COLOR  | TYPE         |
|--------|------|-----------|--------|--------------|
| Media1 | A4   | 62g/m²    | Red    | PLAIN PAPER  |
| Media2 | A4   | 80g/m²    | Yellow | PLAIN PAPER  |
| Paper1 | A4   | 150g/m²   | White  | CARDBOARD    |
| Paper2 | A4   | 64g/m²    | Blue   | COATED PAPER |

PRINTING SYSTEM, PRINTING APPARATUS, PRINTING CONTROL APPARATUS, AND CONTROL METHOD OF PRINTING SYSTEM

CROSS REFERENCE TO RELATED APPLICATIONS

This application is a continuation, and claims the benefit of U.S. patent application Ser. No. 14/327,457, filed on Jul. 9, 2014, which claims the benefit of Japanese Patent Application No. 2013-146311, filed Jul. 12, 2013, all of which is hereby incorporated by reference in their entirety.

BACKGROUND OF THE INVENTION

Field of the Invention

The present invention relates to a printing system capable of effectively using attribute information of a sheet stored in a sheet holding unit of a printing apparatus, the printing apparatus, a printing control apparatus, and a control method of the printing system.

Description of the Related Art

Conventionally, when printing is performed using the printing apparatus including the sheet holding unit, the attribute information of the sheet is generally preset as setting values of the sheet holding unit. Such attribute information of the sheet includes a sheet name, a sheet size, sheet grammage, surface nature of the sheet, and a sheet color. If the sheet attribute information is to be stored as the setting values of the sheet holding unit, it becomes necessary to input the sheet attribute information for each sheet holding unit every time printing is to be performed, which is burdensome for a user. To solve such a problem, Japanese Patent Application Laid-Open No. 2007-241425 discusses a technique for previously registering the attribute information for each sheet in a sheet management database. The user then selects the desired sheet from the sheet management database and stores the attribute information of the selected sheet as the setting values of the sheet holding unit.

The technique discussed in Japanese Patent Application Laid-Open No. 2007-241425 simplifies input of the sheet attribute information for each sheet holding unit every time printing is to be performed. However, if the number of sheets registered in the sheet management database increases, it takes time for the user to search for the desired sheet from all of the sheets registered in the database every time printing is to be performed. An operation by the user thus becomes very complex.

SUMMARY OF THE INVENTION

According to an aspect of the present invention, a printing system includes a printing apparatus communicable with a printing control apparatus, wherein the printing apparatus includes an obtaining unit configured to obtain first attribute information of a sheet stored in a sheet holding unit of the printing apparatus, and a first sending unit configured to send the first attribute information obtained by the obtaining unit to the printing control apparatus, and the printing control apparatus, wherein the printing control apparatus includes an information storing unit configured to store first attribute information of a plurality of sheets and second attribute information of the plurality of sheets, a first receiving unit configured to receive the first attribute information sent by the first sending unit, and a second sending unit configured to read sheet candidates corresponding to the first attribute information received by the first receiving unit from the information storing unit and send the sheet candidates to the printing apparatus, wherein the printing apparatus further includes a second receiving unit configured to receive the sheet candidates sent by the second sending unit, a display unit configured to display the sheet candidates received by the second receiving unit, a selection unit configured to select sheet information from the sheet candidates displayed on a display unit, and a setting unit configured to set the second attribute information of a sheet selected by the selection unit as attribute information of a sheet to be stored in the sheet holding unit.

If the number of sheets registered in a sheet management database increases, time becomes necessary every time a user searches for a desired sheet from the large number of registered sheets. To solve such a problem, control method of a printing system in which a printing apparatus and a printing control apparatus are communicable, the control method of the printing apparatus includes obtaining first attribute information of a sheet stored in a sheet holding unit of the printing apparatus, and sending the obtained first attribute information to the printing control apparatus, the control method of the printing control apparatus includes receiving the sent first attribute information, and determining, based on first attribute information of a plurality of sheets and second attribute information of the plurality of sheets stored in a storing unit of the printing control apparatus, sheet candidates corresponding to the received first attribute information. Further features of the present invention will become apparent from the following description of exemplary embodiments with reference to the attached drawings.

BRIEF DESCRIPTION OF THE DRAWINGS

FIG. 8 illustrates an example of a screen for setting the sheet information registered in the sheet information storing unit in the server according to the first exemplary embodiment.

FIG. 9 illustrates an example of a screen for setting the sheet information for each sheet holding unit registered in the sheet holding unit information storing unit in the server according to the first exemplary embodiment.

FIG. 14 illustrates an example of a sheet candidate list screen displayed on the operation unit of the printing apparatus according to the first exemplary embodiment.

DESCRIPTION OF THE EMBODIMENTS

Various exemplary embodiments, features, and aspects of the invention will be described in detail below with reference to the drawings. The exemplary embodiments do not limit the scope of claims of the present invention and not all combinations of features described in the exemplary embodiments below are always necessary to solve the problems in the present invention.

<The Printing System>

The printing system according to the first exemplary embodiment of the present invention will be described below with reference to FIG. 1.

Figure 1:
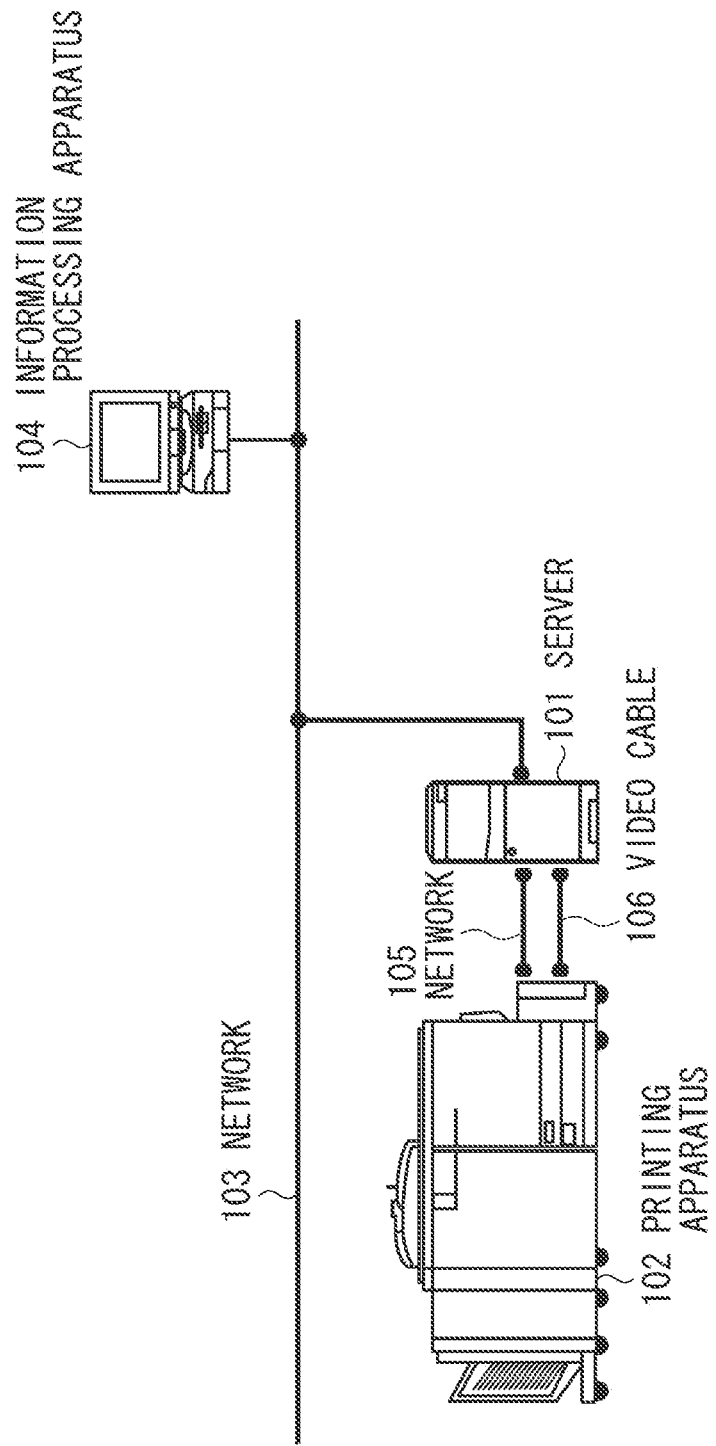
FIG. 1 illustrates a printing system according to a first exemplary embodiment of the present invention.

Referring to FIG. 1, a digital printing apparatus (printing apparatus) 102 includes various functions, such as scanning, printing, and copying functions. A server 101 includes various functions, such as image processing, printing control, and job management functions. An information processing apparatus (e.g., a computer) 104 includes functions for editing and instructing printing of an application file.

In the printing system illustrated in FIG. 1, the printing apparatus 102 and the server 101 are connected via a network 105 and a video cable 106. Further, the server 101 and the information processing apparatus 104 are connected to be communicable via a network 103 such as a local area network (LAN) or a wide area network (WAN), or a wireless LAN. The video cable 106 is used for transferring print images, and the network 105 is used for transmitting and receiving other information. If the functions of the present invention can be implemented, the printing apparatus 102 and the server 101 may be connected by the network such as the LAN or the WAN.

According to the present exemplary embodiment, the information processing apparatus 104 and the printing apparatus 102 do not directly transmit or receive the data and commands between each other. On the other hand, if the information process apparatus 104 performs the operations of the server 101, the information processing apparatus 104 may directly transmit or receive the data and commands to and from the printing apparatus 102. According to the present exemplary embodiment, the information processing apparatus 104 transmits the various data to the server 101, and the server 101 transfers the data to the printing apparatus 102. Further, the server 101 transfers the print job and various control instructions, such as a sleep start instruction, which are received from the information processing apparatus 104 connected thereto via the network 103, to the printing apparatus 102. The user uses the information processing apparatus 104 and can confirm statuses of the job, the server 101, and the printing apparatus 102. Further, the user can issue a shutdown instruction to the server 101 connected to the network 103. Furthermore, the user can directly or remotely control the server 101 and store the attribute information of the sheet as the setting values of the sheet holding unit in the printing apparatus 102.

<The Server Configuration>

An example of the configuration of the server 101 according to the first exemplary embodiment will be described below with reference to FIG. 2.

Figure 2:
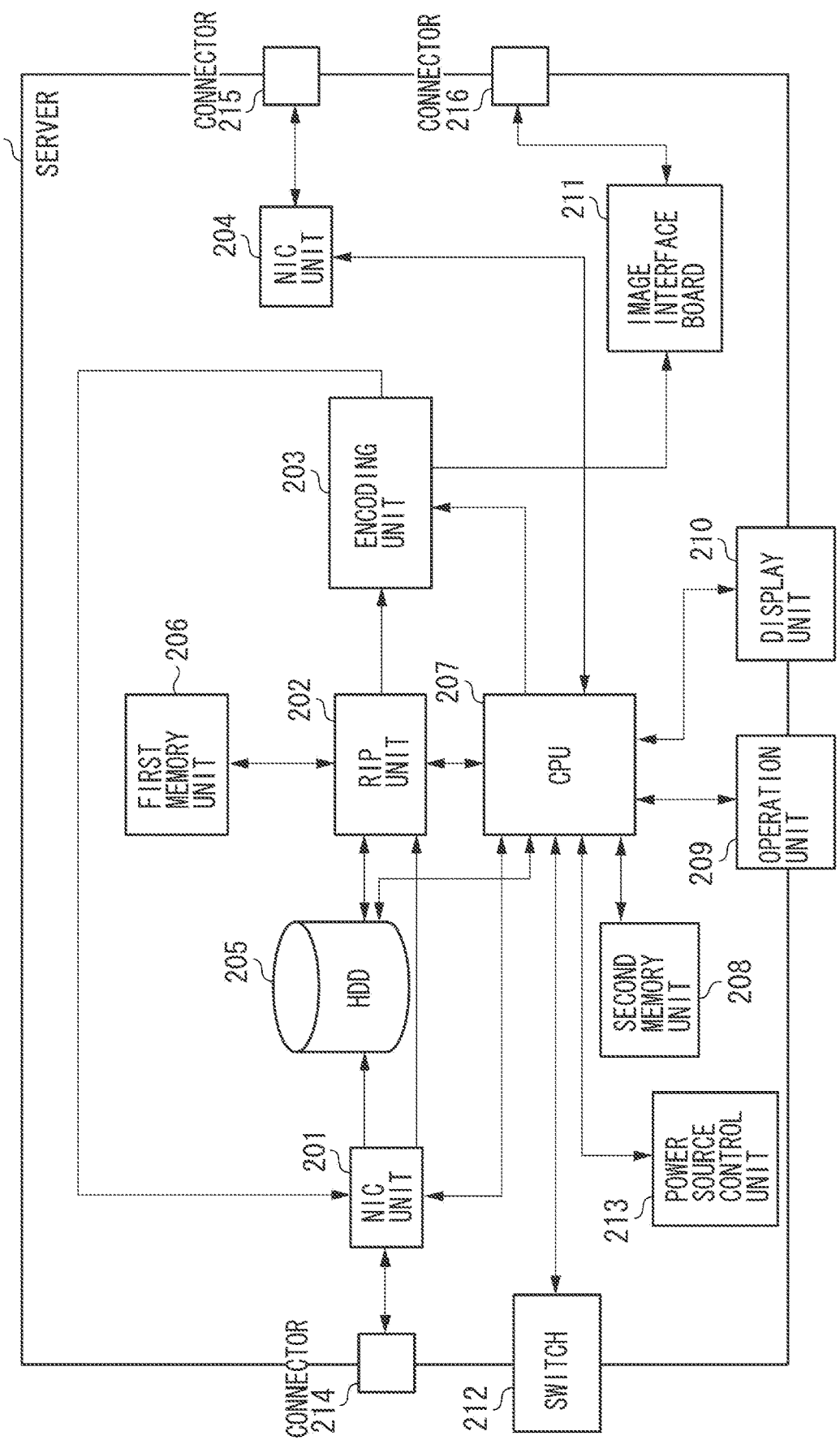
FIG. 2 is a block diagram illustrating a configuration of a server according to the first exemplary embodiment.

Referring to FIG. 2, a network interface card (NIC) unit 201 is a first network interface which realizes low-layer level connection to the network 103. A NIC unit 204 is a second network interface which realizes low-layer level connection.

A raster image processing (RIP) unit 202 performs rasterization of a received print language such as a page description language (PDL) or a specific data format into a raster image. An encoding unit 203 converts the rasterized data to print data or the data format supported by the printing apparatus 102.

A HDD 205 temporarily stores (i.e., spools) the print data received by the NIC unit 201. Further, the HDD 205 temporarily spools compressed data obtained as a result of performing rasterization. Furthermore, the HDD 205 holds the data stored in a sheet information storing unit 501 and a sheet holding unit information storing unit 502 illustrated in FIG. 5 to be described below, and system software for performing the various processes to be described below. The data stored in the sheet information storing unit 501 and the sheet holding unit information storing unit 502 may be held in a non-volatile memory such as a solid state drive (SSD) instead of the HDD 205.

A central processing unit (CPU) 207 controls the processes and the operations performed by the various units included in the server 101. A first memory unit 206 is used by the RIP unit 202 for performing image rasterization. A second memory unit 208 is used by the CPU 207 as a temporary data storage area.

An operation unit 209 includes buttons, keys, and a touch panel, and is used for performing the operations on the server 101. A display unit 210 transmits information to the user by using images and text. An image interface board 211 and a connector 216 for the image interface board 211 generate image data and transfer the image data to a dedicated transmission path. A switch 212 receives power-on and power-off operations by the user. If the user operates the switch 212, the CPU 207 is interrupted. Upon detecting the interruption, the CPU 207 controls a power control unit 213 according to the status.

A data packet transmitted from the information processing apparatus 104 to the server 101 is transferred on the network 103, and is imported by the server 101 via a connector 214. The NIC 201 in the server 101 then receives the data. Upon receiving the print data, the CPU 207 performs control so that the received data is written in the HDD 205 as necessary. Such a process is referred to as a queuing (spooling) process which is generally performed to improve a data transfer speed. The CPU 207 then instructs the RIP unit 202 to read the data stored in the HDD 205. On the other hand, the CPU 207 directly transfers the print data which has not been queued, to the RIP unit 202. The RIP unit 202 thus performs rasterization of the print data transmitted thereto.

The encoding unit 203 which functions as a data format conversion unit then encodes the data to a data format interpretable by the printing apparatus 102, based on the preset data format interpretable by the printing apparatus 102 and the format of the received data. Since the encoding unit 203 performs encoding as necessary, the encoding process may be skipped when it is unnecessary to perform encoding, for example, when the printing apparatus 102 is capable of directly interpreting the format of the received print data. The encoded data needs to be in a format interpretable by the printing apparatus 102.

Examples of the formats interpretable by the printing apparatus 102 include a specific print language format and a data format compressed employing a specific method such as Joint BI-Level Image Experts Group (JBIG). The data format interpretable by the printing apparatus 102 depends on a performance of an interpretation unit included in the printing apparatus 102. The NIC unit 204 then re-generates the data encoded as necessary into a data packet for transmitting to the network 105. The data packet is output from the connector 215 and transmitted to the printing apparatus 102 via the network 105. The data encoded as necessary may be transmitted to the printing apparatus 102 via a local interface such as a universal serial bus (USB).

The printing apparatus 102 having received the data packet prints the data on a recording medium such as a sheet, according to a printing procedure thereof.

The server 101 may also transfer the data as described below. The data is transferred to the image interface board 211 via the encoding unit 203 and output from the connector 216. The data is then transmitted to the printing apparatus 102 via the video cable 106. The information processing apparatus 104 obtains as appropriate the power statuses of the server 101 and the printing apparatus 102, and whether the server 101 and the printing apparatus 102 are normally activating. The information processing apparatus 104 transmits the data packet to the server 101 by making a determination based on the obtained statuses. More specifically, the information processing apparatus 104 performs polling for obtaining the statuses at regular intervals, or obtains a status change notification packet transmitted from the server 101 and the printing apparatus 102. The information processing apparatus 104 thus changes its process that it performs. For example, if the information processing apparatus 104 receives the power status notification packet transmitted by the printing apparatus 102 when the power has been switched off, the information processing apparatus 104 cancels polling. As a result, an unnecessary traffic load can be prevented on the network.

<The Configuration of the Printing Apparatus>

An example of the configuration of the printing apparatus 102 according to the first exemplary embodiment will be described below with reference to FIG. 3.

Figure 3:
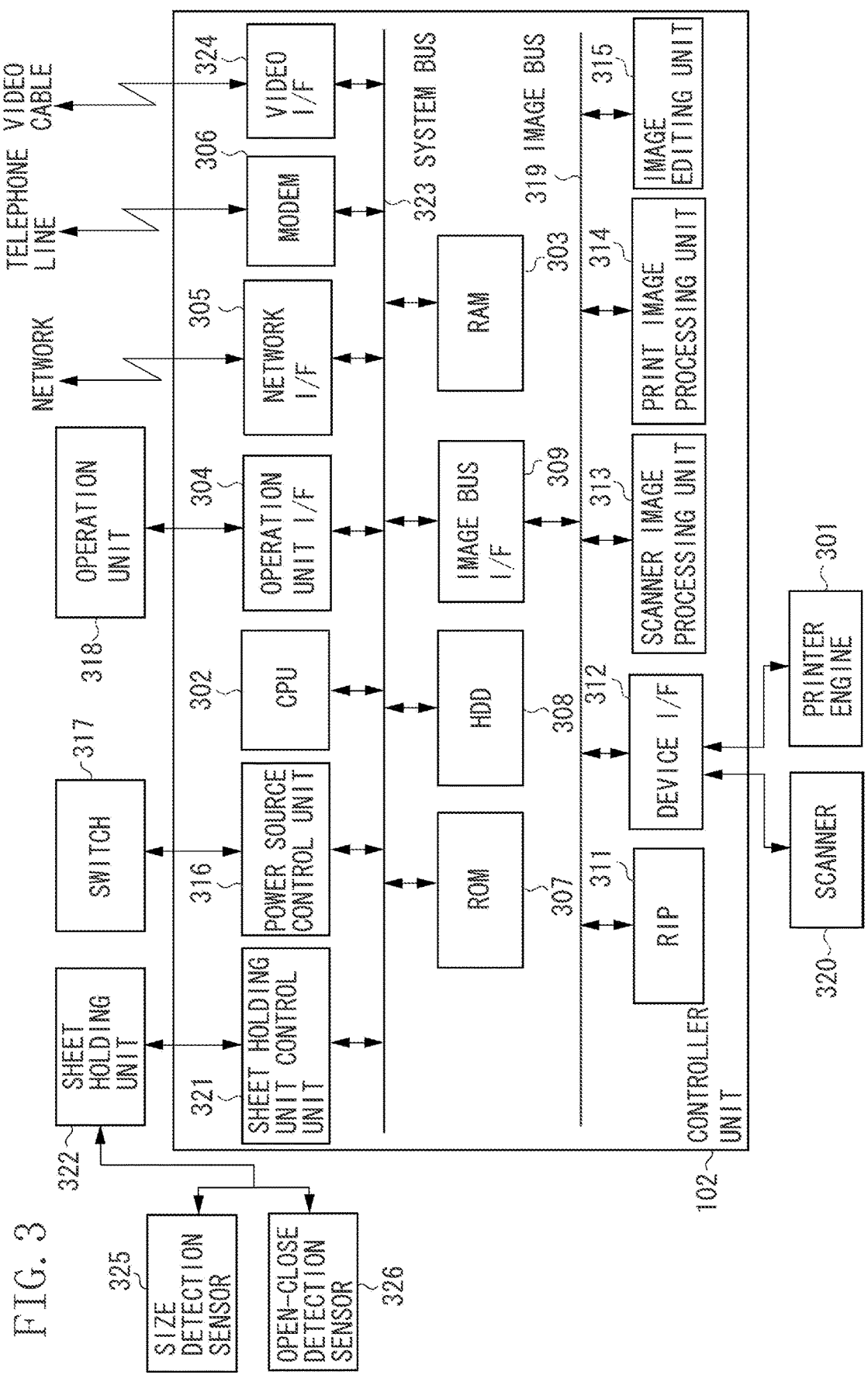
FIG. 3 is a block diagram illustrating the configuration of a printing apparatus according to the first exemplary embodiment.

Referring to FIG. 3, the printing apparatus 102 includes a plurality of sheet holding units 322. The sheet holding unit 322 includes a size detection sensor 325 for detecting the size of the sheet stored in the sheet holding unit 322, and an open-close detection sensor 326 for detecting an open-close operation with respect to the sheet holding unit 322. The sheet holding unit 322 may also include a sensor for detecting a remaining amount of the sheets stored therein, or a sensor for detecting the color and the surface nature of the sheet stored therein.

The printing apparatus 102 is connected to a scanner 320, i.e., an image input device, and a printer engine 301, i.e., an image output device, and performs control for reading and printing the image data. Further, the printing apparatus 102 connects to the network, a telephone line, or the video cable and performs control for inputting and outputting image information and device information via the network or the video cable.

A CPU 302 controls the entire printing apparatus 102. A random access memory (RAM) 303 is a system work memory for the CPU 302 to operate, and an image memory for temporarily storing the input image data. A read-only memory (ROM) 307 is a boot ROM which stores a boot program of the system. A HDD 308 stores the system software for performing various processes and the input image data.

Figure 4:
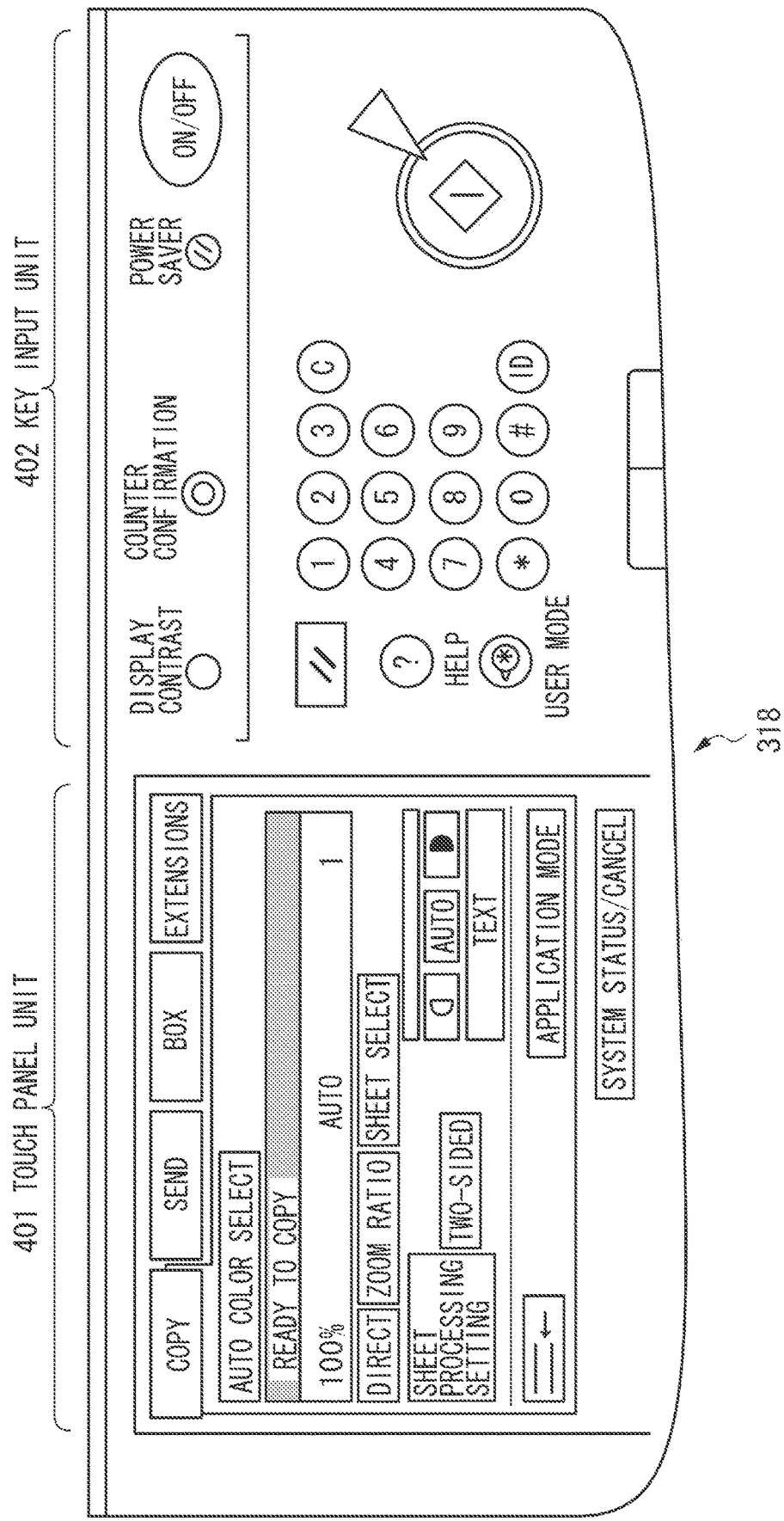
FIG. 4 is a top view illustrating an operation unit of the printing apparatus according to the first exemplary embodiment.

An operation unit interface (I/F) 304 is an interface unit for an operation unit 318 which includes a display screen capable of displaying the image data, and outputs operation screen data to the operation unit 318. Further, the operation unit I/F 304 transmits the information input by the user from the operation unit 318 to the CPU 302. The operation unit 318 includes a touch panel unit 401 and a key input unit 402 as illustrated in FIG. 4. Further, the operation unit 318 provides the various interfaces for the user to perform various settings and operations on the printing apparatus 102 according to the first exemplary embodiment.

A network I/F 305, e.g., a LAN card, is connected to the network and inputs and outputs information from and to external apparatuses. A modem 306 is connected to the telephone line and inputs and outputs information from and to the external apparatuses. A video I/F 324 is connected to the video cable and inputs and outputs information from and to the external apparatuses.

The above-described units are arranged on a system bus 323.

An image bus I/F 309 is an interface for connecting the system bus 323 and an image bus 319 which transfers the image data at high speed, and is a bus bridge which converts a data structure. The image bus 319 is connected to a RIP 311, a device I/F unit 312, a scanner image processing unit 313, a printer image processing unit 314, and an image editing unit 315.

The RIP 311 performs rasterization of the PDL data into the raster image. The device I/F 312 performs synchronous/asynchronous conversion of the image data with respect to the scanner 320 and the printer engine 301. The scanner image processing unit 313 performs various processes such as correction, processing, and editing with respect to the image data input from the scanner 320. The printer image processing unit 314 performs processes such as correction and resolution conversion with respect to the image data to be printed, according to the printer engine 301. The image editing unit 315 performs various image processing such as rotation of the image data and compression/decompression of the image data.

A switch 317 receives the power-on and power-off operations by the user. If the user operates the switch 317, the CPU 302 is interrupted. Upon detecting the interruption, the CPU 302 controls a power control unit 316 according to the status.

A sheet holding unit control unit 321 is a module for storing the sheet attribute information as the setting values with respect to the sheet holding unit 322, and controlling the sheet attribute information and feeding of the sheets. Further, the sheet holding unit control unit 321 stores the setting information received from the operation unit 318 and the attribute information of the sheet detected by the sheet holding unit 322. The printing apparatus 102 then controls printing based on the sheet attribute information stored as the setting values of the sheet holding unit. For example, the printing apparatus 102 determines, based on the size of the sheet to be used in a print job when printing, the sheet holding unit 322 which is to feed the sheet. The printing apparatus 102 then performs control so that the sheet is fed from the determined sheet holding unit 322. Further, the printing apparatus 102 controls a sheet conveyance speed and temperature of a fixing device based on the grammage and the type of the sheet. Furthermore, the sheet holding unit control unit 321 obtains the information on the open-close operation of the sheet holding unit 322 from the open-close detection sensor 326, and detects whether the open sheet holding unit 322 has been closed.

Figure 5:
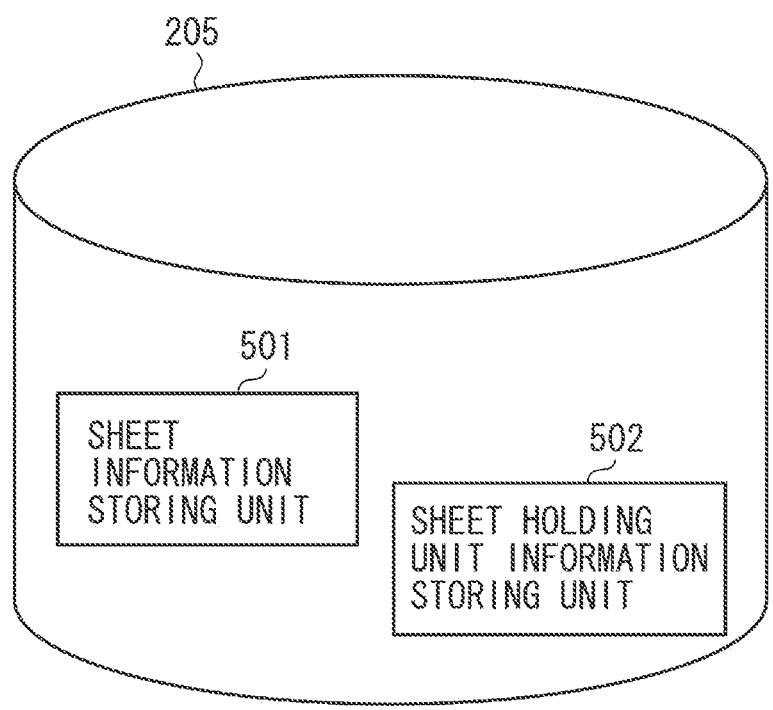
FIG. 5 illustrates data stored in a hard disk drive (HDD) of a server according to the first exemplary embodiment.

According to the present exemplary embodiment, the sheet information storing unit 501 and the sheet holding unit information storing unit 502 are included as storing areas in the HDD 205 of the server 101 as illustrated in FIG. 5. However, the sheet information storing unit 501 and the sheet holding unit information storing unit 502 may be included as the storing areas in the HDD 308 of the printing apparatus 102. Further, the sheet information storing unit 501 and the sheet holding unit information storing unit 502 may be included as the storing areas in a non-volatile memory (not illustrated) in the information processing apparatus 104. In such a case, the data stored in the sheet information storing unit 501 and the sheet holding unit information storing unit 502 may be referred to via the network 103.

The sheet information storing unit 501 stores as a list, all of the sheet attribute information registered by the user. The user then selects a specific sheet from all of the sheets stored in the sheet information storing unit 501 and assigns the selected sheet to the sheet holding unit. The sheet holding unit information storing unit 502 thus stores the attribute information of the sheet for each sheet holding unit as a list.

Figure 6:
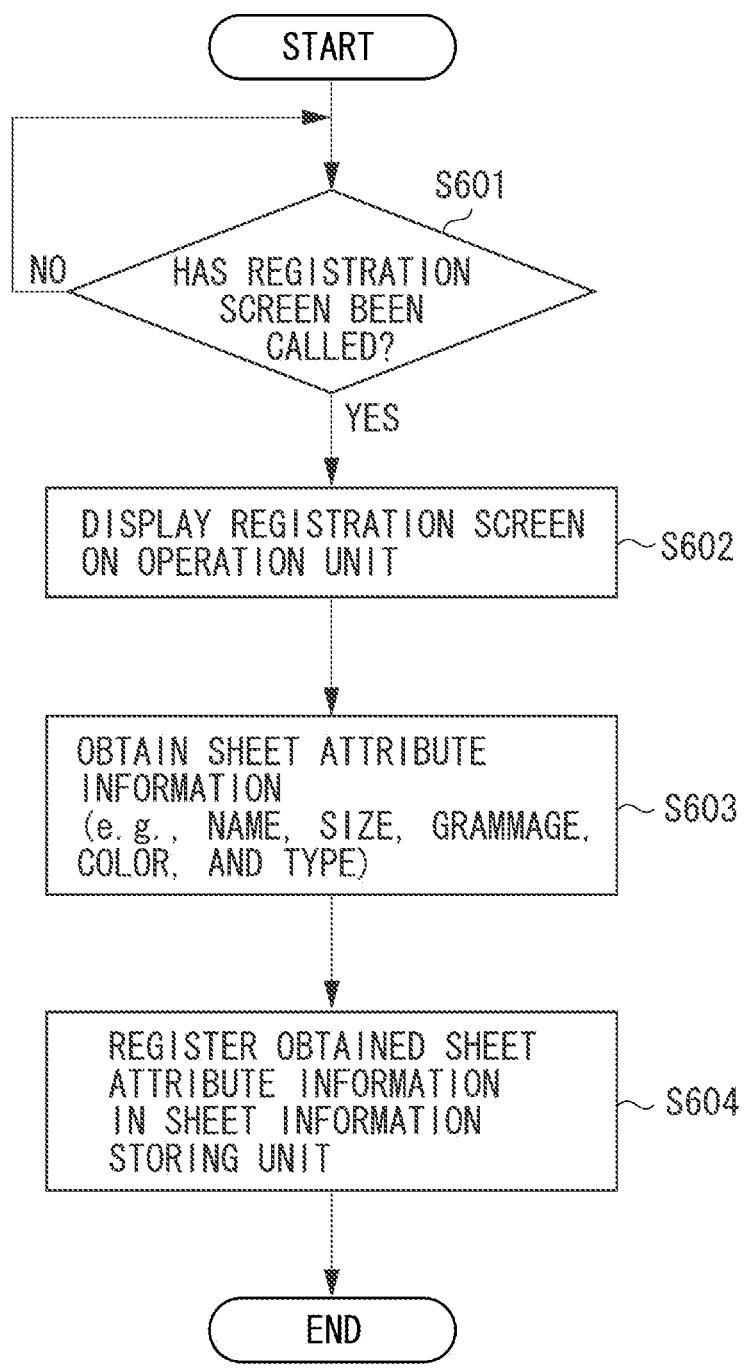
FIG. 6 is a flowchart illustrating a process for registering sheet information in a sheet information storing unit, to be performed by the server according to the first exemplary embodiment.

The process for registering the sheet information in the sheet information storing unit 501 will be described below with reference to the flowchart illustrated in FIG. 6. The process illustrated in the flowchart is realized by the CPU 207 in the server 101 executing the program read from the HDD 205 and expanded on the second memory unit 208. According to the present exemplary embodiment, the server 101 performs the process for registering the sheet information in the sheet information storing unit 501. However, the printing apparatus 102 or the information processing apparatus 104 may perform the process.

In step S601, the CPU 207 determines whether a registration screen 801 as illustrated in FIG. 8 has been called. The registration screen 801 is displayed on the operation unit 209 of the server 101. Further, the attribute information of the sheet such as the sheet name, size, grammage, color, and type is registered as a list.

If the CPU 207 determines that the registration screen 801 has been called (YES in step S601), the process proceeds to step S602. On the other hand, if the CPU 207 determines that the registration screen 801 has not been called (NO in step S601), the CPU 207 stands by in step S601.

In step S602, the CPU 207 displays the registration screen 801 on the operation unit 209 of the server 101. In step S603, the CPU 207 obtains the attribute information of the sheet such as the sheet name, size, grammage, color, and type input by the user to a sheet information input screen (not illustrated). The attribute information of the sheet may be imported from the external apparatus such as the information processing apparatus 104. In step S604, when the user presses a register button in the sheet information input screen (not illustrated), the CPU 207 registers the sheet attribute information obtained in step S603 in the sheet information storing unit 501.

The process for registering the sheet information in the sheet information storing unit 501 is as described above.

Figure 7:
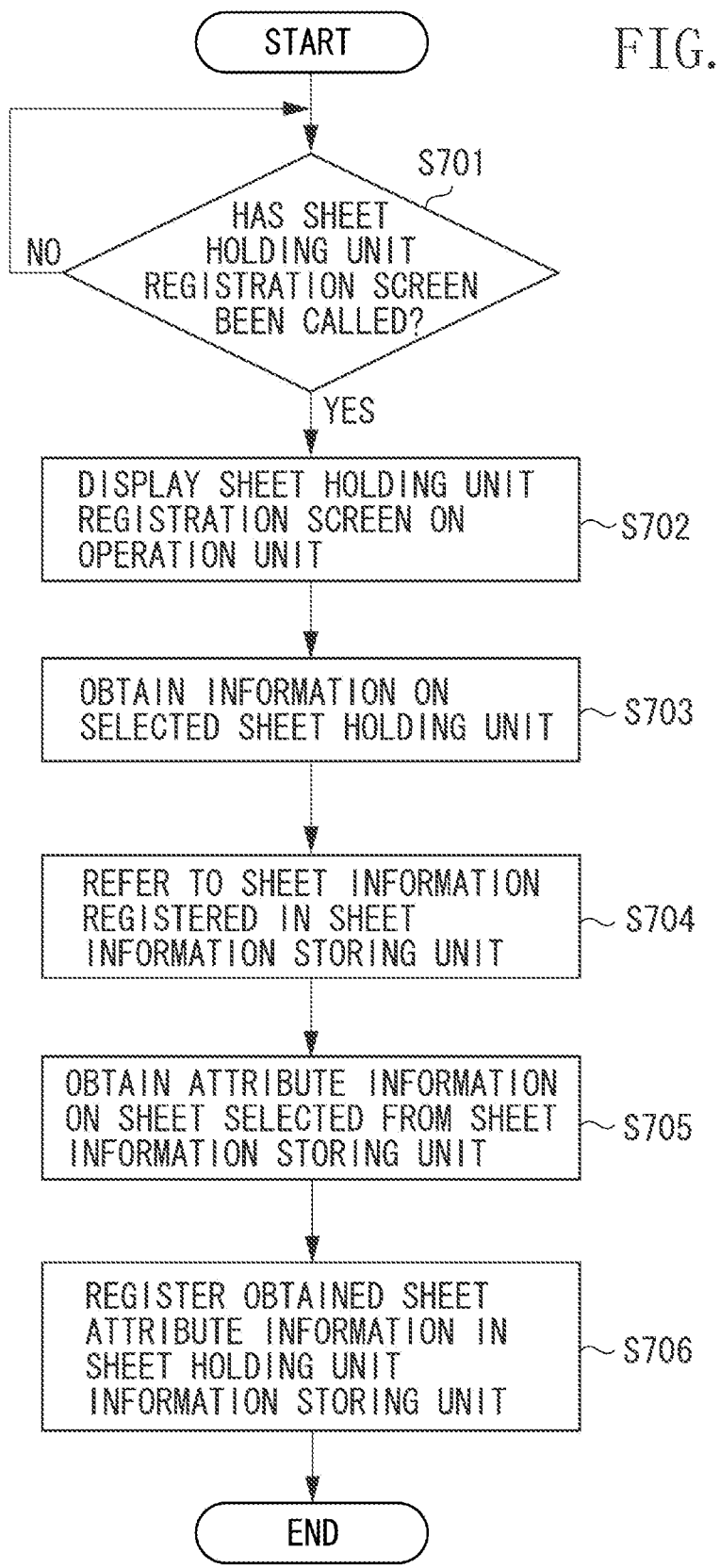
FIG. 7 is a flowchart illustrating a process for registering the sheet information for each sheet holding unit in a sheet holding unit information storing unit, to be performed by the server according to the first exemplary embodiment.

The process for registering the sheet information for each sheet holding unit in the sheet holding unit information storing unit 502 will be described below with reference to FIG. 7. The process illustrated in the flowchart is realized by the CPU 207 in the server 101 executing the program read from the HDD 205 and expanded on the second memory unit 208. According to the present exemplary embodiment, the server 101 registers the sheet information for each sheet holding unit in the sheet holding unit information storing unit 502. However, the printing apparatus 102 or the information processing apparatus 104 may perform the process.

In step S701, the CPU 207 determines whether a sheet holding unit registration screen 901 as illustrated in FIG. 9 has been called. The sheet holding unit registration screen 901 is displayed on the operation unit 209 of the server 101. Further, the attribute information of the sheet such as the sheet name, size, grammage, color, and type is registered as a list. Referring to FIG. 9, the sheet information, such as "Name: Paper3, Size: A3, Grammage: 80 g/m$^2$, Color: White, Type: Plain paper" is registered with respect to both Tray 1 and Tray 2. The same sheet information may thus be registered with respect to a plurality of sheet holding units in the sheet holding unit information storing unit 502.

If the CPU 207 determines that the sheet holding unit registration screen 901 has been called (YES in step S701), the process proceeds to step S702. On the other hand, if the CPU 207 determines that the sheet holding unit registration screen 901 has not been called (NO in step S701), the CPU 207 stands by in step S701 until the sheet holding unit registration screen 901 is called.

In step S702, the CPU 207 displays the sheet holding unit registration screen 901 on the operation unit 209 of the server 101. In step S703, the CPU 207 obtains the information on the sheet holding unit which has been selected by the user on the operation unit 209. In step S704, the CPU 207 refers to all of the sheet information registered in the sheet information storing unit 501. In step S705, the CPU 207 obtains the attribute information of the sheet selected by the user from among the sheet information referred to in step S704. The attribute information of the sheet obtained in step S705 includes the sheet name, size, grammage, color, and type. Further, the attribute information of the sheet may be imported from the external apparatus such as the information processing apparatus 104. In step S706, when the user presses the register button in the sheet information input screen (not illustrated), the CPU 207 registers the sheet attribute information obtained in step S705 with respect to the sheet holding unit in the sheet holding unit information storing unit 502, based on the information of the sheet holding unit obtained in step S703.

The process performed by the server 101 for registering the sheet information for each sheet holding unit in the sheet holding unit information storing unit 502 is as described above.

The operations performed by the above-described configurations according to the present exemplary embodiment will be described below.

The process performed by the printing apparatus 102 for storing the attribute information of a specific sheet as the setting values of the sheet holding unit according to the first exemplary embodiment will be described below with reference to the flowchart illustrated in FIG. 10. The process illustrated in the flowchart is realized by the CPU 302 in the printing apparatus 102 executing the program read from the HDD 308 and expanded on the RAM 303. According to the present exemplary embodiment, the printing apparatus 102 performs the process for storing the attribute information of a specific sheet as the setting values with respect to the sheet holding unit. However, the server 101 or the information processing apparatus 104 may perform the process.

In step S1001, the CPU 302 determines whether the sheet holding unit in an opened state has been closed. If the CPU 302 determines that the sheet holding unit has been closed (YES in step S1001), the process proceeds to step S1002. If the CPU 302 determines that the sheet holding unit has not been closed (NO in step S1001), the process stands by in step S1001. The CPU 302 is capable of determining whether the opened sheet holding unit has been closed based on the information obtained from the open-close detection sensor 326 illustrated in FIG. 3.

The processes of step S1002 and the subsequent steps are performed in the following case. The CPU 302 obtains as appropriate the power statuses of the server 101 and the printing apparatus 102, and information whether the server 101 and the printing apparatus 102 are normally activating. If the CPU 302 determines that the server 101 has been switched on and is in the normally activating state based on the obtained statuses, the processes of step S1002 and the subsequent steps are performed.

In step S1002, the CPU 302 obtains the size of the sheet stored in the sheet holding unit determined to be closed in step S1001. The CPU 302 then transmits the obtained size information to the server 101 via the network 105. The CPU 302 is capable of determining the size of the sheet stored in the sheet holding unit based on the information obtained from the size detection sensor 325 illustrated in FIG. 3. The information transmitted by the printing apparatus 102 in step S1002 is received by the server 101 in step S1101 in the flowchart illustrated in FIG. 11 to be described below.

In step S1003, the CPU 302 determines whether a response has been received from the server 101 via the network 105 after transmitting the sheet size information to the server 101 in step S1002. If the CPU 302 determines that a response has been received from the server 101 (YES in step S1003), the process proceeds to step S1004. If the CPU 302 determines that a response has not been received from the server 101 (NO in step S1003), the CPU 302 stands by in step S1003. If there is no response from the server 101 for a predetermined period, the a time-out occurs, and the process for storing the attribute information of a specific sheet as the setting values with respect to the sheet holding unit illustrated in FIG. 10 may be ended. The information received by the printing apparatus 102 in step S1003 is the response transmitted from the server 101 in step S1105 of the flowchart illustrated in FIG. 11 to be described below.

In step S1004, the CPU 302 determines whether the sheet attribute information has been received from the server 101. If the CPU 302 determines that the sheet attribute information has been received from the server 101 (YES in step S1004), the process proceeds to step S1005. If the CPU 302 determines that the sheet attribute information has not been received from the server 101 (NO in step S1004), the CPU 302 stores default sheet attribute information (e.g., "Size: A4, Color: White, Type: Plain paper") with respect to the sheet holding unit, and ends the process. The information received by the printing apparatus 102 in step S1004 is transmitted from the server 101 in step 1104 of the flowchart illustrated in FIG. 11 to be described below.

In step S1005, the CPU 302 determines whether the sheet attribute information received from the server 101 is the attribute information of a plurality of sheets. If the CPU 302 determines that the sheet attribute information received from the server 101 is the attribute information of a plurality of sheets (YES in step S1005), the process proceeds to step S1006. If the CPU 302 determines that the sheet attribute information received from the server 101 is not the attribute information of a plurality of sheets (NO in step S1005), the CPU 302 specifies the sheet received from the server 101 and the process proceeds to step S1007.

In step S1006, the CPU 302 obtains the attribute information of one specific sheet from the attribute information of the plurality of sheets received from the server 101. The details on the process performed in step S1006 according to the first exemplary embodiment will be described below. In step S1007, the CPU 302 stores the attribute information of the specific sheet received from the server 101 as the setting values of the sheet holding unit determined to be closed in step S1001. The process for storing the attribute information of the specific sheet with respect to the sheet holding unit thus ends.

Figure 12:
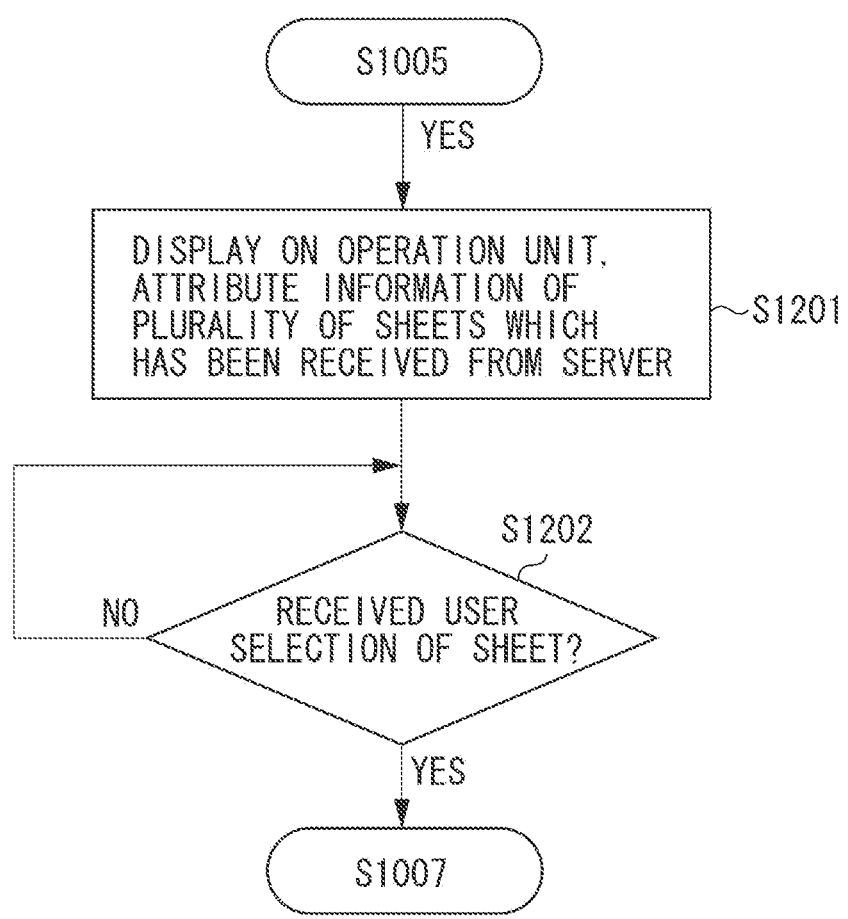
FIG. 12 is a flowchart illustrating in detail the process performed in step S1006 of the flowchart illustrated in FIG. 10 by the printing apparatus according to the first exemplary embodiment.

The details on the process performed in step S1006 according to the first exemplary embodiment will be described below with reference to the flowchart illustrated in FIG. 12. In step S1201, the CPU 302 displays a candidate list screen 1401 as illustrated in FIG. 14 on the operation unit 318 of the printing apparatus 102 as the list of the attribute information of the plurality of sheets received from the server 101. The CPU 302 may also store history information of the sheets used in the jobs in the HDD 308 of the printing apparatus 102. The CPU 302 may then display the list of the attribute information of the plurality of sheets on the operation unit 318 as follows. The CPU 302 refers to the history information, obtains the history, and sorts the attribute information of the plurality of sheets in the list according to a used date and time, starting from the most recently used sheet.

The user can thus arbitrarily select one sheet from the sheet candidates on the candidate list screen 1401. According to the present exemplary embodiment, all of the attribute information on the sheet is displayed on the operation unit 318 as illustrated in FIG. 14. However, the display form is not limited thereto. For example, if the sheet attribute information received from the server 101 further includes remarks on the name of the sheet, the remarks may also be displayed on the operation unit 318. As a result, if the user cannot determine the desired sheet based on only the sheet attribute information, the user can refer to the remarks and determine the desired sheet. On the other hand, if the user can specify the sheet based only on the sheet name, the operation unit 318 may only display the sheet name. By the above-described specifications, the sheet candidates can be displayed for the user even when there is a limit on the display area of the operation unit 318.

In step S1202, the CPU 302 determines whether the user has selected one sheet on the candidate list screen 1401 displayed on the operation unit 318. If the CPU 302 determines that the user has selected one sheet (YES in step S1202), the CPU 302 identifies the selected sheet and proceeds to step S1007. On the other hand, if the CPU 302 determines that the user has not selected one sheet (NO in step S1202), the process stands by in step S1202 until the user has selected one sheet.

The process for searching for the sheet registered in the sheet holding unit information storing unit 502 by the server 101 according to the first exemplary embodiment will be described below with reference to the flowchart illustrated in FIG. 11. The process illustrated in the flowchart is realized by the CPU 207 in the server 101 executing the program read from the HDD 205 and expanded on the second memory unit 208. According to the present exemplary embodiment, the server 101 performs the process for searching for the sheet registered in the sheet holding unit information storing unit 502. However, the printing apparatus 102 or the information processing apparatus 104 may perform the process.

In step S1101, the CPU 207 receives the information on the size of the sheet currently stored in the sheet holding unit from the printing apparatus 102 via the network 105. The information received by the server 101 in step 1101 is transmitted from the printing apparatus 102 in step S1002 of the flowchart illustrated in FIG. 10 described above.

In step S1102, the CPU 207 searches for the sheet of the corresponding size from among the sheet information registered with respect to the sheet holding unit in the sheet holding unit information storing unit 502. The CPU 207 makes a search based on the size information of the sheet stored in the sheet holding unit received in step S1101. According to the present exemplary embodiment, the sheet of the corresponding size refers to the sheet whose size matches the size of the sheet stored in the sheet holding unit.

In step S1103, the CPU 207 determines whether there is a sheet of the matching size as a result of the search performed in step S1102.

If the CPU 207 determines that there is a sheet of the matching size (YES in step S1103), the process proceeds to step S1104. If the CPU 207 determines that there is no sheet of the matching size (NO in step S1103), the process proceeds to step S1105.

In step 1104, the CPU 207 transmits the attribute information of the sheet of the matching size to the printing apparatus 102. The attribute information transmitted to the printing apparatus 102 includes the grammage, the color, and the type in addition to the paper size as information to be set as the setting values of the sheet holding unit. The information transmitted from the server 101 in step 1104 is received by the printing apparatus 102 in step S1004 of the flowchart illustrated in FIG. 10. The CPU 207 may also store the history information of the sheets used in the jobs in the HDD 205 of the server 101. The CPU 207 may then transmit the list of the attribute information of the sheets to the printing apparatus 102 as follows. The CPU 207 refers to the history information, obtains the history, and sorts the attribute information of the plurality of sheets to make the list according to the used date and time, starting from the most recently used sheet.

Figure 11:
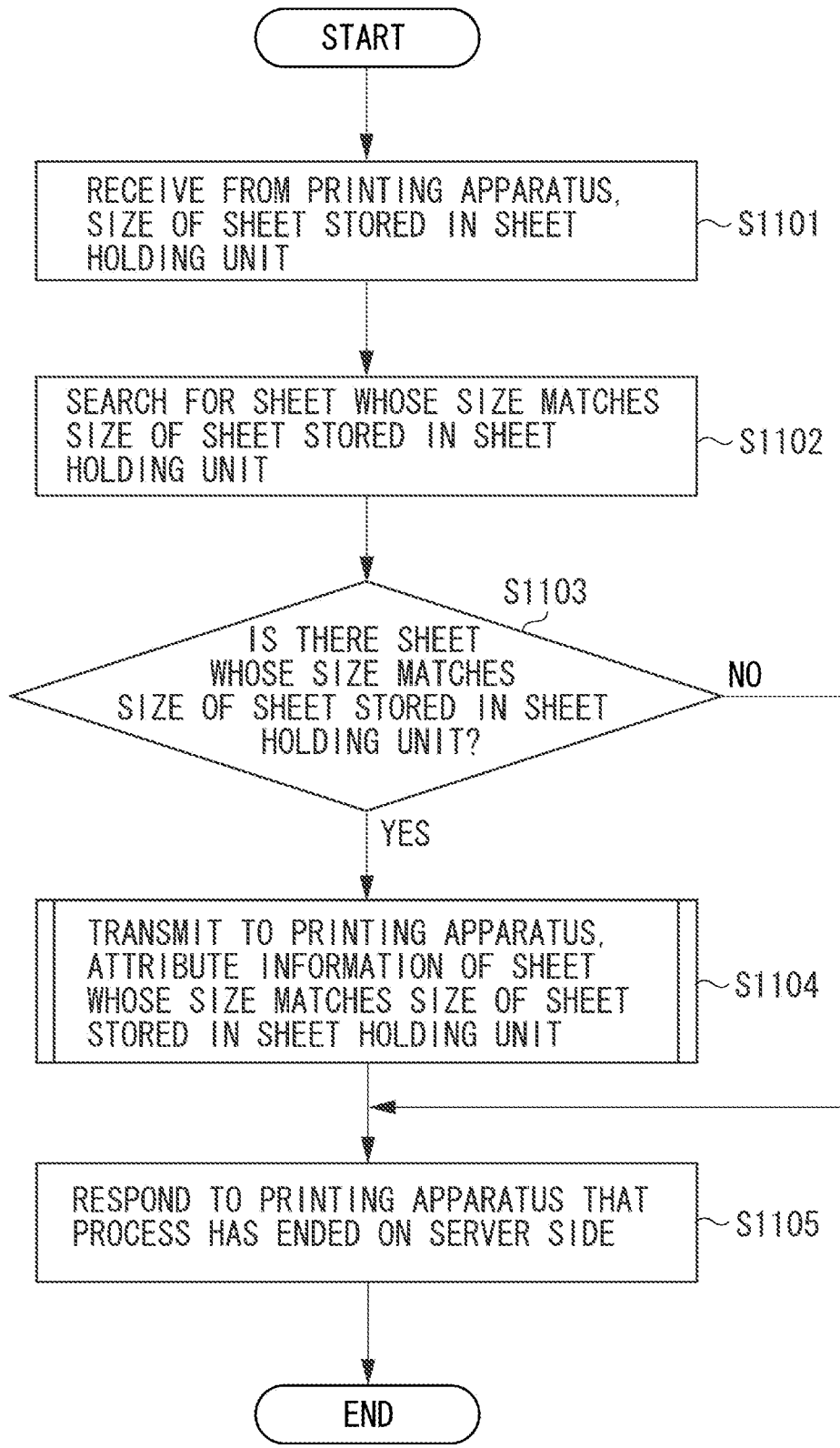
FIG. 11 is a flowchart illustrating the process for searching for the sheet registered in the sheet holding unit information storing unit, to be performed by the server according to the first exemplary embodiment.
Figure 13:
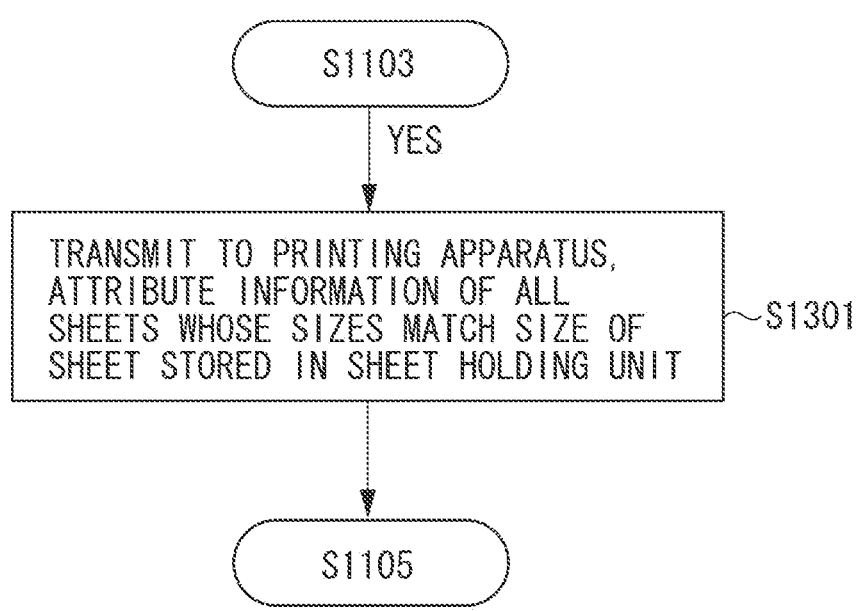
FIG. 13 is a flowchart illustrating in detail the process to be performed in step 1104 of the flowchart illustrated in FIG. 11 by the server according to the first exemplary embodiment.

FIG. 13 is a flowchart illustrating in detail the process performed in step 1104 of the flowchart illustrated in FIG. 11 according to the first exemplary embodiment. In step S1301, the CPU 207 transmits the attribute information of all sheets of the matching size to the printing apparatus 102.

In step S1105, the CPU 207 responds to the printing apparatus 102 via the network 105 that the process performed in the server 101 has been completed. The process for searching for the sheet registered in the sheet holding unit information storing unit 502 thus ends. The information transmitted from the server 101 as the response in step 1105 is received by the printing apparatus 102 in step S1003 of the flowchart illustrated in FIG. 10.

As described above, according to the first exemplary embodiment, when the sheet holding unit has been closed, the CPU 207 searches the sheet holding unit information storing unit 502 based on the size of the sheet stored in the closed sheet holding unit. The CPU 207 then displays the attribute information of all sheets on the candidate list screen 1401 illustrated in FIG. 14. The user can thus select the desired sheet from the sheets displayed on the candidate list screen 1401, and store the selected attribute information as the setting values of the closed sheet holding unit. As a result, the user can easily store the setting values of the sheet holding unit by only closing the sheet holding unit and selecting from the candidate list screen 1401. It thus becomes unnecessary for the user to input the sheet attribute information every time from scratch.

According to the first exemplary embodiment, if the CPU 207 determines in step S1103 of the flowchart illustrated in FIG. 11 that there is no sheet whose size matches the size of the sheet stored in the sheet holding unit as a result of the search, the CPU 207 proceeds to step S1105. In step S1105, the CPU 207 responds to the printing apparatus 102 via the network 105 that the process performed in the server 101 has been completed. However, the processing is not limited thereto, and if there is no sheet of the matching size as a result of the search, the CPU 207 may transmit the attribute information of all of the sheets stored in the sheet information storing unit 501 to the printing apparatus 102, and perform the subsequent processes.

Further, according to the first exemplary embodiment, when the opened sheet holding unit has been closed, the size of the sheet stored in the sheet holding unit is transmitted to the server 101, and the subsequent processes are performed. However, the processing is not limited thereto. For example, a button for transmitting the size of the sheet stored in the sheet holding unit to the server 101 may be disposed on the operation unit 318. If the user presses the button, the size of the sheet stored in the sheet holding unit is transmitted to the server 101, and the subsequent processes are performed.

Furthermore, according to the first exemplary embodiment, the information transmitted to the server 101 is the size of the sheet stored in the sheet holding unit. However, the information is not limited thereto. For example, if the sensor included in the sheet holding unit is capable of detecting the color of the sheet, the information on the color of the sheet may be transmitted to the server 101 along with the sheet size. The sheet may then be specified based on both the color and the size of the sheet. Moreover, only the color of the sheet may be transmitted to the server 101 without transmitting the sheet size, and the sheet may be specified based on only the sheet color.

According to the above-described first exemplary embodiment, if there is a plurality of sheets whose conditions match the attribute information of the sheet stored in the sheet holding unit which is registered in the sheet holding unit information storing unit 502, the list of the sheets which match the conditions are displayed for the user. The user then selects the desired sheet. In contrast, according to the second exemplary embodiment, if there is a plurality of sheets whose conditions match the attribute information of the sheet stored in the sheet holding unit, the following is performed. An attribute value of the sheet which is effective for specifying one sheet is displayed on the operation unit 318 of the printing apparatus 102 for the user to select the sheet. Such a process will be described below.

Figure 10:
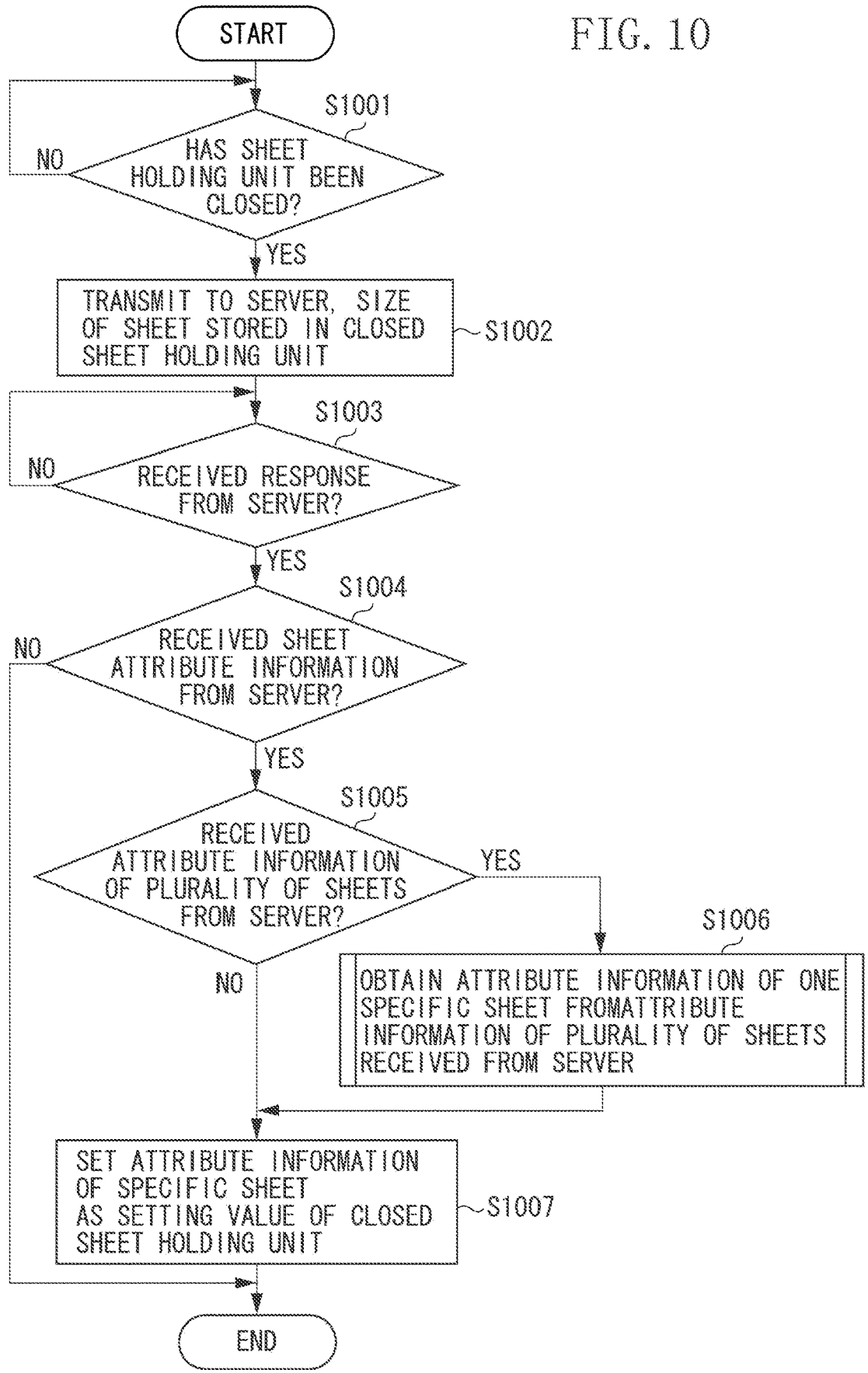
FIG. 10 is a flowchart illustrating the process for setting the attribute information of a specific sheet to the sheet holding unit in the printing apparatus according to the first exemplary embodiment.

According to the second exemplary embodiment, the process performed by the printing apparatus 102 for storing the attribute information of the specific sheet as the setting value with respect to the sheet holding unit is as illustrated in the flowchart of FIG. 10 similar to the first exemplary embodiment. The description on the processes in common with the first exemplary embodiment will thus be omitted.

Figure 15:
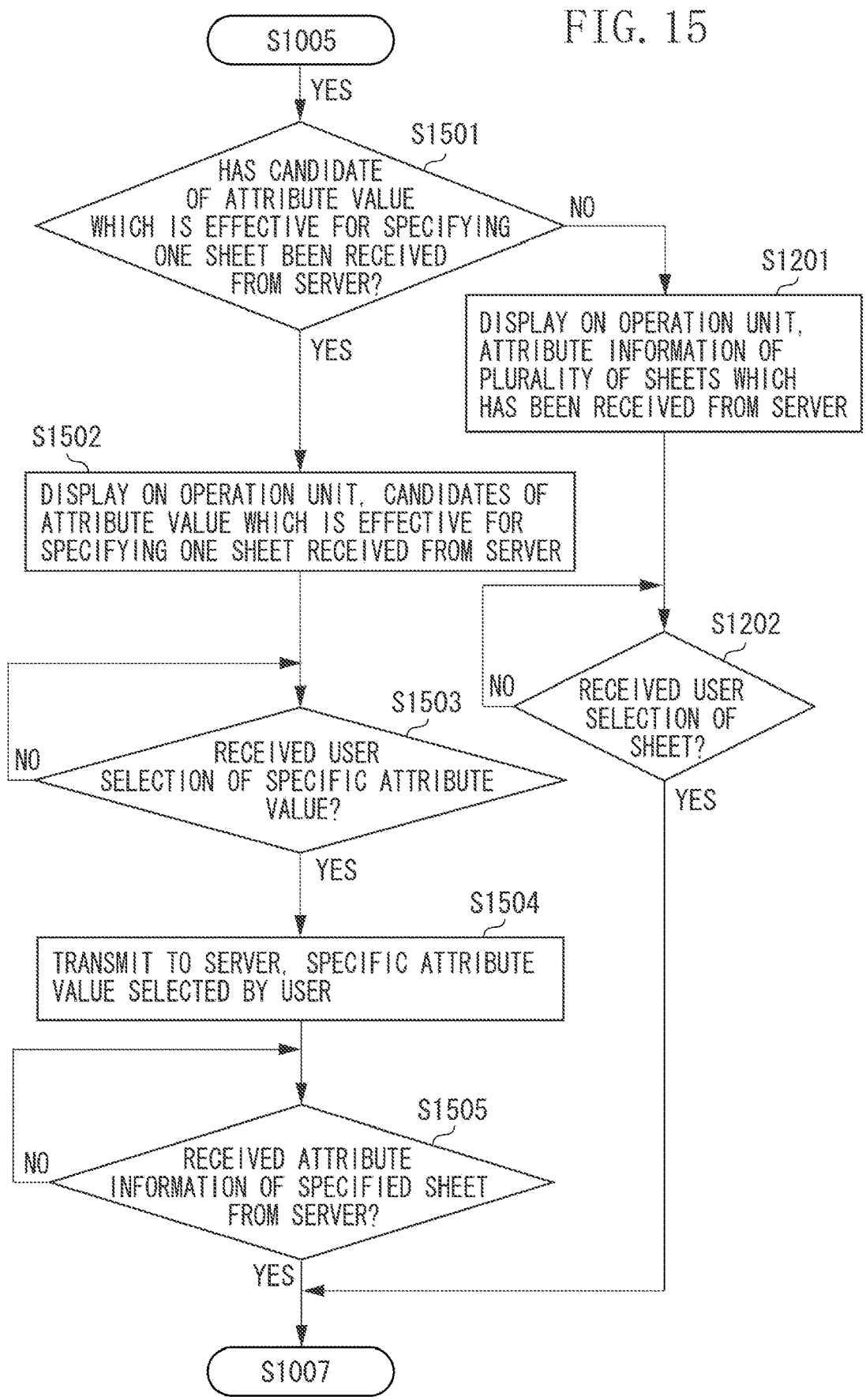
FIG. 15 is a flowchart illustrating in detail the process to be performed in step S1006 of the flowchart illustrated in FIG. 10 by the printing apparatus according to a second exemplary embodiment of the present invention.

Further, according to the second exemplary embodiment, the process performed in step S1006 of the flowchart illustrated in FIG. 10 is different from the process performed according to the first exemplary embodiment. The process performed in step S1006 according to the second exemplary embodiment will be described in detail with reference to the flowchart illustrated in FIG. 15.

According to the second exemplary embodiment, the printing apparatus 102 performs the process for storing the attribute information of the specific sheet as the setting value with respect to the sheet holding unit, and the process of step S1006. However, instead of the printing apparatus 102, the server 101 or the information processing apparatus 104 may perform the processes.

Figure 16:
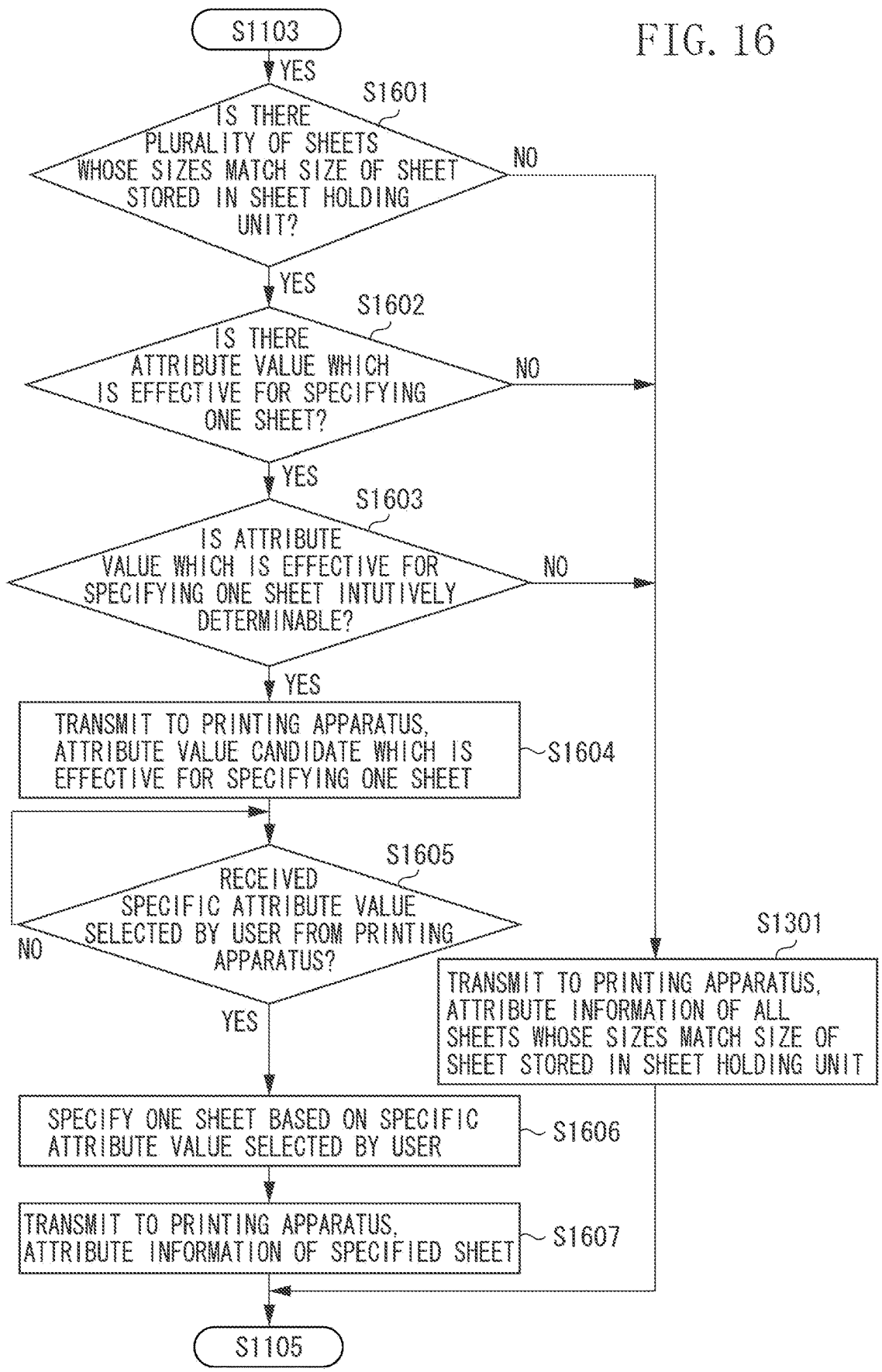
FIG. 16 is a flowchart illustrating in detail the process to be performed in step 1104 of the flowchart illustrated in FIG. 11 by the server according to the second exemplary embodiment.

In step S1501, the CPU 302 determines whether the candidates of the attribute value effective for specifying one sheet have been received from the server 101. The information received by the printing apparatus 102 in step S1501 is transmitted from the server 101 in step 1604 of the flowchart illustrated in FIG. 16 to be described below.

If the CPU 302 determines that the candidates of the attribute value effective for specifying one sheet have been received from the server 101 (YES in step S1501), the process proceeds to step S1502. On the other hand, if the CPU 302 determines that the candidates of the attribute value effective for specifying one sheet have not been received from the server 101 (NO in step S1501), the process proceeds to step S1201. Since the process of step S1201 and the subsequent steps are similar to those according to the first exemplary embodiment, description will be omitted.

Figure 17:
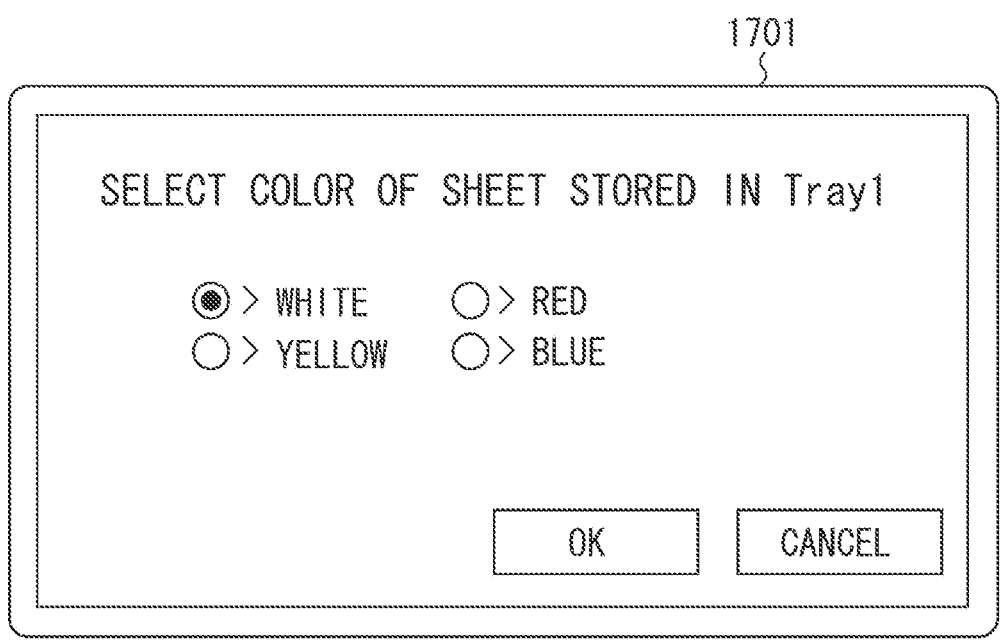
FIG. 17 illustrates an example of a setting screen displayed on the operation unit of the printing apparatus according to the second exemplary embodiment.

In step S1502, the CPU 302 displays the candidates of the attribute value of the sheet effective for specifying one sheet from among the plurality of sheets whose sheet size match on the operation unit 318 of the printing apparatus 102. According to the present exemplary embodiment, a selection screen 1701 as illustrated in FIG. 17 is displayed on the operation unit 318.

In step S1503, the CPU 302 determines whether a user selection of the specific attribute value has been received on the selection screen 1701 displayed on the operation unit 318. If the CPU 302 determines that the user selection of the specific attribute value has been received (YES in step S1503), the process proceeds to step S1504. If the CPU 302 determines that the user selection of the specific attribute value has not been received (NO in step S1503), the process stands by in step S1503.

In step S1504, the CPU 302 transmits the specific attribute value selected on the selection screen 1701, to the server 101 via the network 105. For example, if the user selects "white" on the selection screen 1701, the CPU 207 transmits the information indicating that the color of the sheet stored in Tray1 is white, to the server 101. The information transmitted from the printing apparatus 102 in step S1504 is received by the server 101 in step 1605 of the flowchart illustrated in FIG. 16 to be described below.

In step S1505, the CPU 302 determines whether the attribute information of the one sheet specified based on the specific attribute value transmitted in step S1504 has been received from the server 101 via the network 105. The attribute information of the sheet transmitted in step S1505 includes the grammage, color, and type of the sheet in addition to the size, as the information to be set as the setting values of the sheet holding unit. The information received by the printing apparatus 102 in step S1505 is transmitted from the server 101 in step 1607 of the flowchart illustrated in FIG. 16 to be described below.

If the CPU 302 determines that the attribute information of the specified one sheet has been received from the server 101 (YES in step S1505), the process proceeds to step S1007 of the flowchart illustrated in FIG. 10. On the other hand, if the CPU 302 determines that the attribute information of the one sheet which has been specified has not been received from the server 101 (NO in step S1505), the CPU 302 stands by in step S1505.

The process for storing the attribute information of the specific sheet as the setting values with respect to the sheet holding unit performed by the printing apparatus 102 is as described above.

According to the second exemplary embodiment, the process performed by the server 101 for searching for the sheet registered in the sheet holding unit information storing unit 502 is as illustrated in the flowchart of FIG. 11 similar to the first exemplary embodiment. The description on the processes in common with the first exemplary embodiment will thus be omitted.

Further, according to the second exemplary embodiment, the process performed in step S1104 of the flowchart illustrated in FIG. 11 is different from the process performed according to the first exemplary embodiment. The process performed in step S1104 according to the second exemplary embodiment will be described in detail with reference to the flowchart illustrated in FIG. 16.

In step S1601, the CPU 207 determines, based on the search result obtained in step S1102 of the flowchart illustrated in FIG. 11, whether there is a plurality of sheets whose size matches the size of the sheet stored in the sheet holding unit. If the CPU 207 determines that there is a plurality of sheets whose size matches the size of the sheet stored in the sheet holding unit (YES in step S1601), the process proceeds to step S1602. If the CPU 207 determines that there is one or no sheet whose size matches the size of the sheet stored in the sheet holding unit (NO in step S1601), the process proceeds to step S1301. Since the processes of step S1301 and the subsequent steps are similar to the steps of the flowchart illustrated in FIG. 13, description will be omitted.

In step S1602, the CPU 207 determines whether there is the attribute information which is effective for specifying one sheet from the plurality of sheets whose size matches the size of the sheet stored in the sheet holding unit. For example, it is assumed that the attribute information of the plurality of sheets whose size matches the size of the sheet stored in the sheet holding unit is "A4, red, plain paper", "A4, yellow, plain paper", and "A4, blue, coated paper". In such a case, the sheet color becomes the attribute information which is effective for specifying one sheet. On the other hand, in this example, the sheet cannot be specified based on the sheet type, so that the sheet type is not the attribute information which is effective for specifying one sheet.

If the CPU 207 determines that there is the attribute information which is effective for specifying one sheet (YES in step S1602), the CPU 207 determines the attribute information which is effective for specifying one sheet, and the process proceeds to step S1603. If the CPU 207 determines that there is no attribute information which is effective for specifying one sheet (NO in step S1602), the process proceeds to step S1301.

In step S1603, the CPU 207 determines whether the attribute information determined to be effective for specifying one sheet is attribute information which is intuitively determinable. Such attribute information which is intuitively determinable is attribute information that the user can visually determine, e.g., the sheet size, the sheet color, and the sheet type. In contrast, the sheet grammage is preset on the server 101 as the attribute information that the user cannot visually determine. Alternatively, whether the attribute information is intuitively determinable may be classified and set by the user.

If the CPU 207 determines that the attribute information determined to be effective for specifying one sheet is the attribute information which is intuitively determinable (YES in step S1603), the process proceeds to step S1604. If the CPU 207 determines that the attribute information determined to be effective for specifying one sheet is not the attribute information which is intuitively determinable (NO in step S1603), the process proceeds to step S1301.

In step S1604, the CPU 207 transmits the candidates of the attribute value determined to be effective for specifying one sheet, to the printing apparatus 102 via the network 105. The information transmitted by the server 101 in step S1604 is received by the printing apparatus 102 in step S1501 of the flowchart illustrated in FIG. 15.

In step S1605, the CPU 207 determines whether the specific attribute value of the sheet selected by the user has been received from the printing apparatus 102 via the network 105. The information received by the server 101 in step S1605 is transmitted by the printing apparatus 102 in step S1504 of the flowchart illustrated in FIG. 15.

If the CPU 207 determines that the specific attribute value of the sheet selected by the user has been received (YES in step S1605), the process proceeds to step S1606. If the CPU 207 determines that the specific attribute value of the sheet selected by the user has not been received (NO in step S1605), the process stands by in step S1605.

In step S1606, the CPU 207 specifies, based on the received specific attribute value, one sheet from among the plurality of sheets whose size matches the size of the sheet.

In step S1607, the CPU 207 transmits the attribute information of the sheet specified in step S1606 to the printing apparatus 102, and the process proceeds to step S1105. The information transmitted by the server 101 in step S1607 is received by the printing apparatus 102 in step S1505 of the flowchart illustrated in FIG. 15 described above.

The process for searching for the sheet registered in the sheet holding unit information storing unit 502 performed by the server 101 according to the second exemplary embodiment is as described above.

As described above, according to the second exemplary embodiment, if there is a plurality of sheets whose size matches the size of the sheet stored in the sheet holding unit, the following is performed. The candidates of the attribute value which is determined to be effective for specifying one sheet and intuitively determinable are displayed on the selection screen 1701 illustrated in FIG. 17. The user then selects the desired attribute value from the attribute values of the sheets displayed in the selection screen 1701. The user can thus store the attribute information of the sheet specified based on the selected attribute value as the setting values of the closed sheet holding unit. The user is capable of easily storing the setting values of the sheet holding unit by only closing the opened sheet holding unit and making a selection from the selection screen 1701. It is thus unnecessary for the user to input the sheet attribute information every time from scratch. Further, the time for the user to search for the attribute values that the user cannot intuitively determine is reduced by displaying only the candidates of the attribute value which is intuitively determinable.

According to the second exemplary embodiment, when the opened sheet holding unit has been closed, the size of the sheet stored in the sheet holding unit is transmitted to the server 101, and the subsequent processes are performed. However, the exemplary embodiment is not limited thereto. For example, a button for transmitting the size of the sheet stored in the sheet holding unit to the server 101 may be disposed on the operation unit 318. If the user then presses the button, the size of the sheet stored in the sheet holding unit is transmitted to the server 101, and the subsequent processes are performed.

Furthermore, according to the second exemplary embodiment, the information transmitted to the server 101 is the size of the sheet stored in the sheet holding unit. However, the exemplary embodiment is not limited thereto. For example, if the sensor included in the sheet holding unit is capable of detecting the color of the sheet, the information on the color of the sheet may be transmitted to the server 101 along with the sheet size. The sheet may then be specified based on both the color and the size of the sheet. Moreover, only the color of the sheet may be transmitted to the server 101 without transmitting the sheet size, and the sheet may be specified based on only the sheet color.

According to the above-described second exemplary embodiment, if there is a plurality of sheets whose size matches the size of the sheet stored in the sheet holding unit, the server 101 determines the sheet attribute information effective for specifying one sheet. In contrast, according to the third exemplary embodiment, the user previously designates the sheet attribute information to be used in specifying one sheet on the printing apparatus 102.

According to the third exemplary embodiment, the process performed by the printing apparatus 102 for storing the attribute information of the specific sheet as the setting values with respect to the sheet holding unit is as illustrated in the flowchart of FIG. 10 similar to the first exemplary embodiment. The description on the processes in common with the first exemplary embodiment will thus be omitted.

Figure 18:
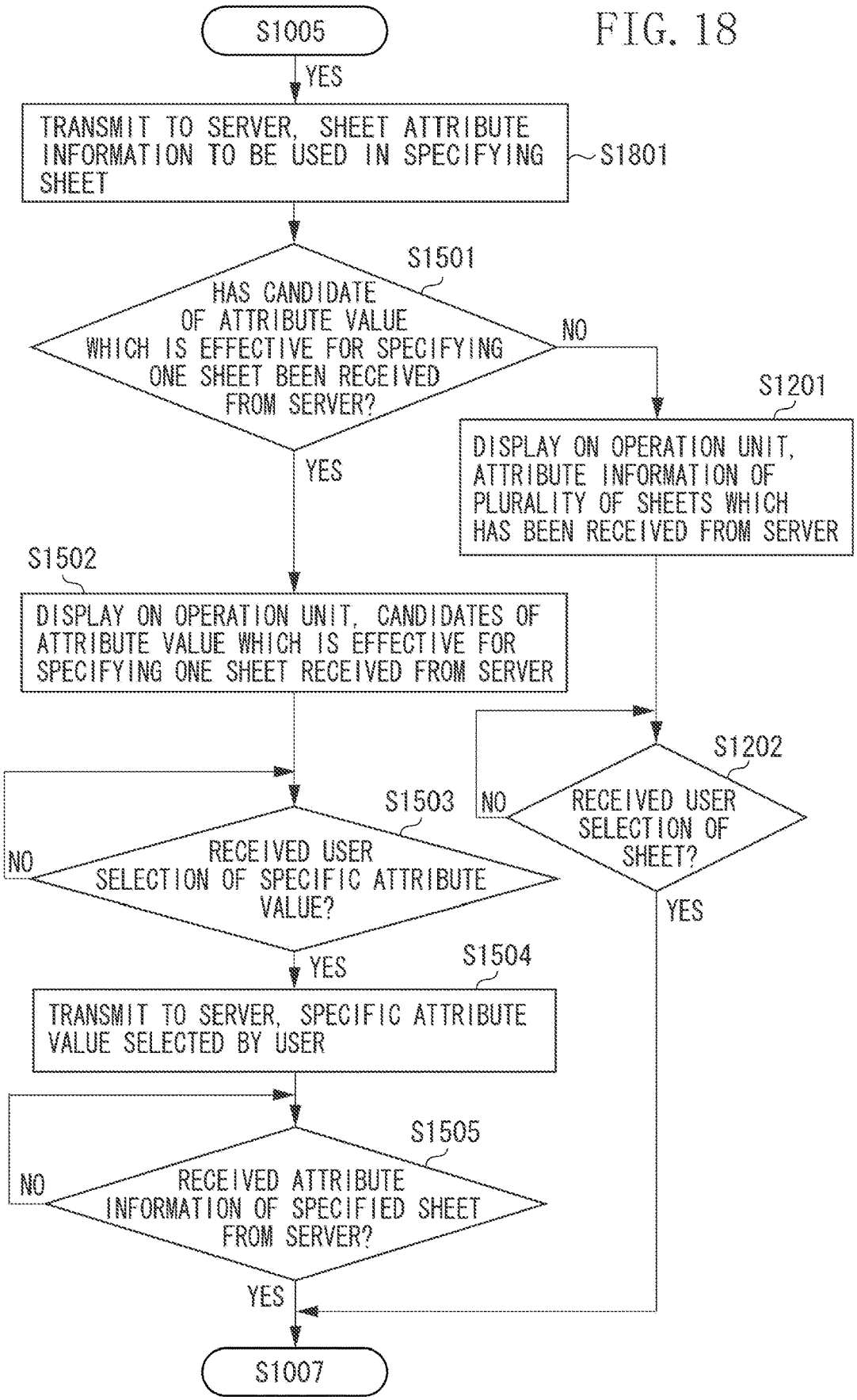
FIG. 18 is a flowchart illustrating in detail the process to be performed in step S1006 of the flowchart illustrated in FIG. 10 by the printing apparatus according to a third exemplary embodiment of the present invention.

According to the third exemplary embodiment, the process performed in step S1006 of the flowchart illustrated in FIG. 10 is different from the process performed according to the first and second exemplary embodiments. The process performed in step S1006 according to the third exemplary embodiment will be described in detail with reference to the flowchart illustrated in FIG. 18.

According to the third exemplary embodiment, the printing apparatus 102 performs the process for storing the attribute information of the specific sheet as the setting values with respect to the sheet holding unit, and the process of step S1006. However, the server 101 or the information processing apparatus 104 may perform the processes.

Figure 19:
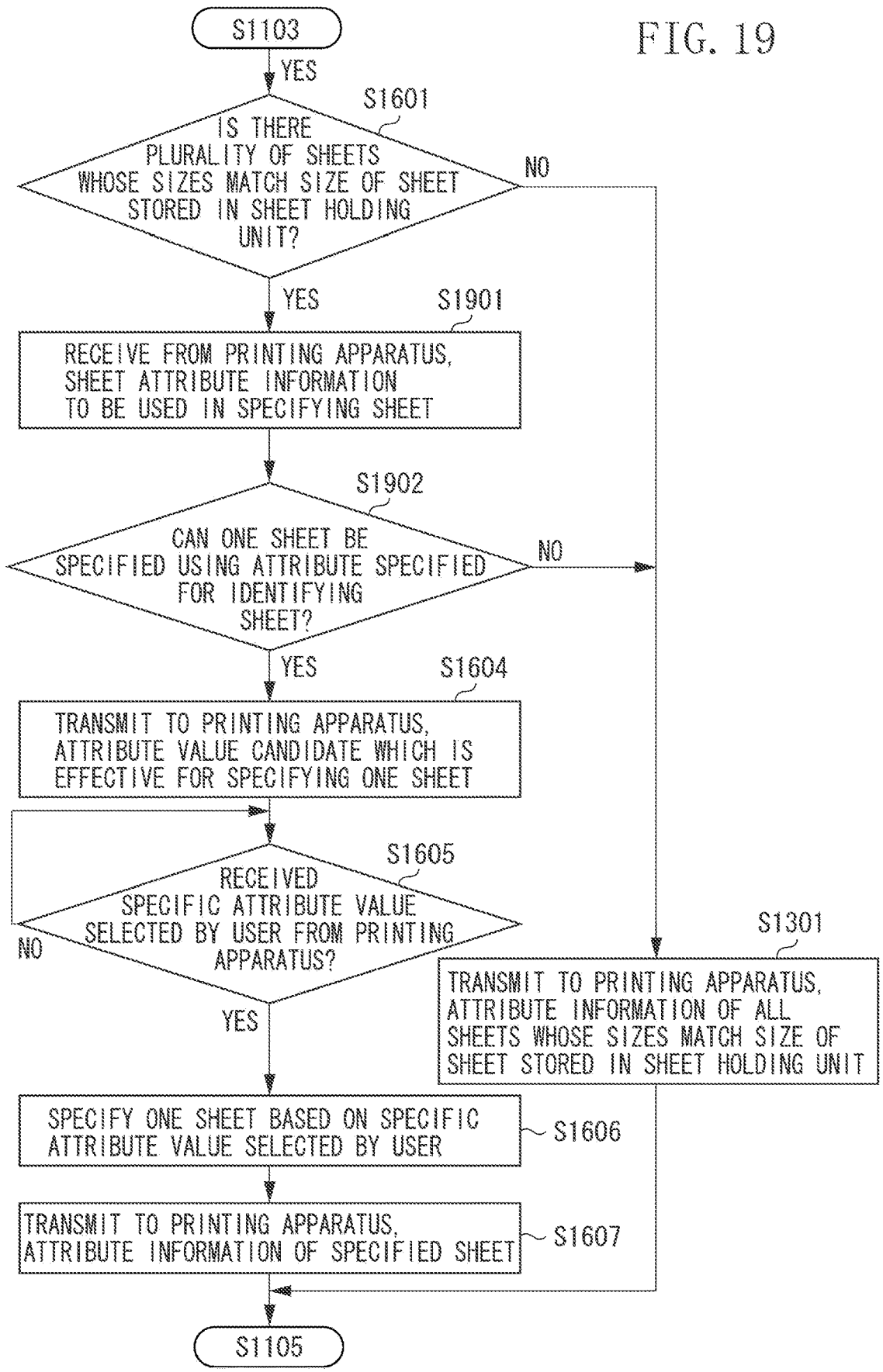
FIG. 19 is a flowchart illustrating in detail the process to be performed in step 1104 of the flowchart illustrated in FIG. 11 by the server according to the third exemplary embodiment.
Figure 20:
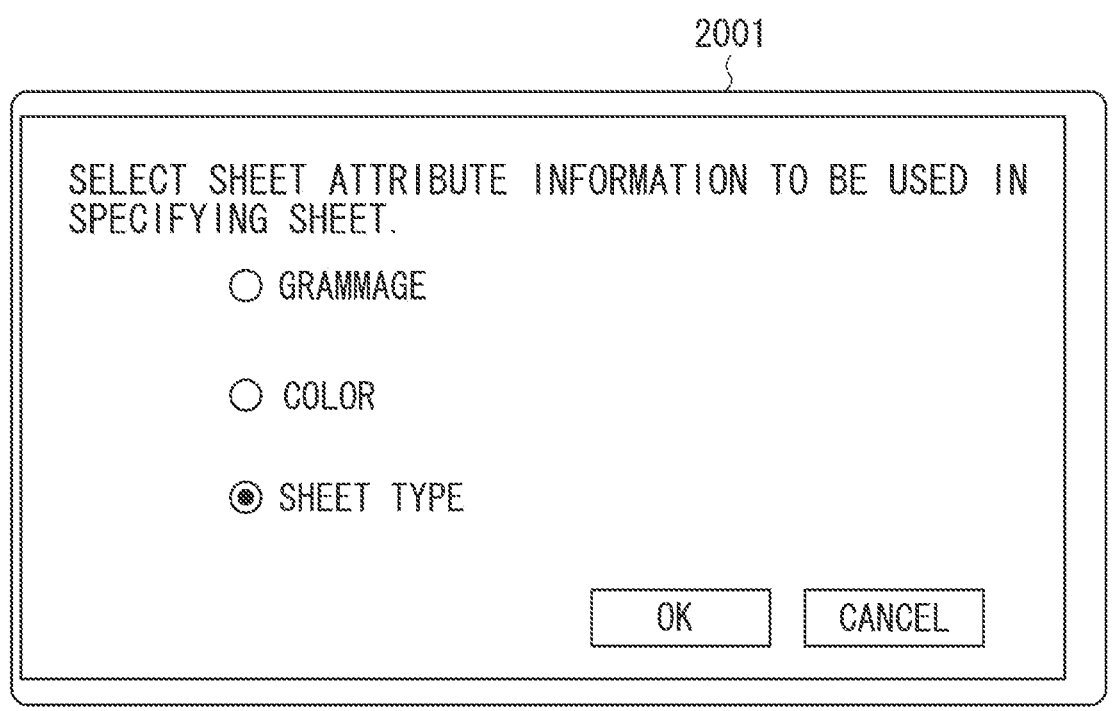
FIG. 20 illustrates an example of a setting screen displayed on the operation unit of the printing apparatus according to the third exemplary embodiment.

In step S1801, the CPU 302 displays a selection screen 2001 as illustrated in FIG. 20, and causes the user to designate the sheet attribute information to be used in specifying the sheet. The CPU 302 then transmits the sheet attribute information to be used in specifying the designated sheet to the server 101. The information transmitted by the printing apparatus 102 in step S1801 is received by the server 101 in step S1901 of the flowchart illustrated in FIG. 19 to be described below.

The process then proceeds to step S1501. Since the process of step S1501 and the subsequent steps are similar to those according to the second exemplary embodiment, description will be omitted.

The process for storing the attribute information of the specific sheet as the setting values with respect to the sheet holding unit performed by the printing apparatus 102 according to the third exemplary embodiment is as described above.

Since the process performed by the server 101 according to the third exemplary embodiment is as illustrated in the flowchart of FIG. 11 similar to the first exemplary embodiment, the description on the processes in common with the first exemplary embodiment will thus be omitted.

Further, according to the third exemplary embodiment, the process performed in step S1104 of the flowchart illustrated in FIG. 11 is different from the process performed according to the first and second exemplary embodiments. The process performed in step S1104 according to the third exemplary embodiment will be described in detail with reference to the flowchart illustrated in FIG. 19.

According to the third exemplary embodiment, the server 101 performs the process for searching for the sheet registered in the sheet holding unit information storing unit, and the process of step S1104. However, the printing apparatus 102 or the information processing apparatus 104 may perform the processes.

The description on the processes performed in step S1601 and the subsequent steps which are in common with those according to the second exemplary embodiment will be omitted.

If the CPU 207 determines that there is a plurality of sheets whose size matches the size of the sheet stored in the sheet holding unit (YES in step S1601), the process proceeds to step S1901. In step S1901, the CPU 207 receives the sheet attribute information for specifying one sheet, from the printing apparatus 102 via the network 105. The information received by the server 101 in step S1901 is transmitted from the printing apparatus 102 in step S1801 of the flowchart illustrated in FIG. 18.

In step S1902, the CPU 207 determines whether one sheet can be specified from among the plurality of sheets whose size matches the size of the sheet stored in the sheet holding unit based on the sheet attribute information received in step S1901.

If the CPU 207 determines that one sheet can be specified from among the plurality of sheets whose size matches the size of the sheet stored in the sheet holding unit (YES in step S1902), the process proceeds to step S1604. Since the processes performed in step S1604 and the subsequent steps are similar to those according to the second exemplary embodiment, description will be omitted. If the CPU 207 determines that one sheet cannot be specified from among the plurality of sheets whose size matches the size of the sheet stored in the sheet holding unit (NO in step S1902), the process proceeds to step S1301. Since the processes performed in step S1301 and the subsequent steps are similar to those according to the first exemplary embodiment, description will be omitted.

The process for searching for the sheet registered in the sheet holding unit information storing unit performed by the server 101 according to the third exemplary embodiment is as described above.

As described above, according to the third exemplary embodiment, the user previously designates the sheet attribute information to be used for specifying one sheet on the printing apparatus 102. As a result, the user can specify one sheet based on the desired sheet attribute information, and the setting values of the closed sheet holding unit can be easily stored.

According to the fourth exemplary embodiment, the attribute information of the sheet to be used in a job to be printed that has been stored and retained in the HDD 205 of the server 101 (i.e., a print job on hold) is preferentially stored as the setting values of the sheet holding unit as described below.

Figure 21:
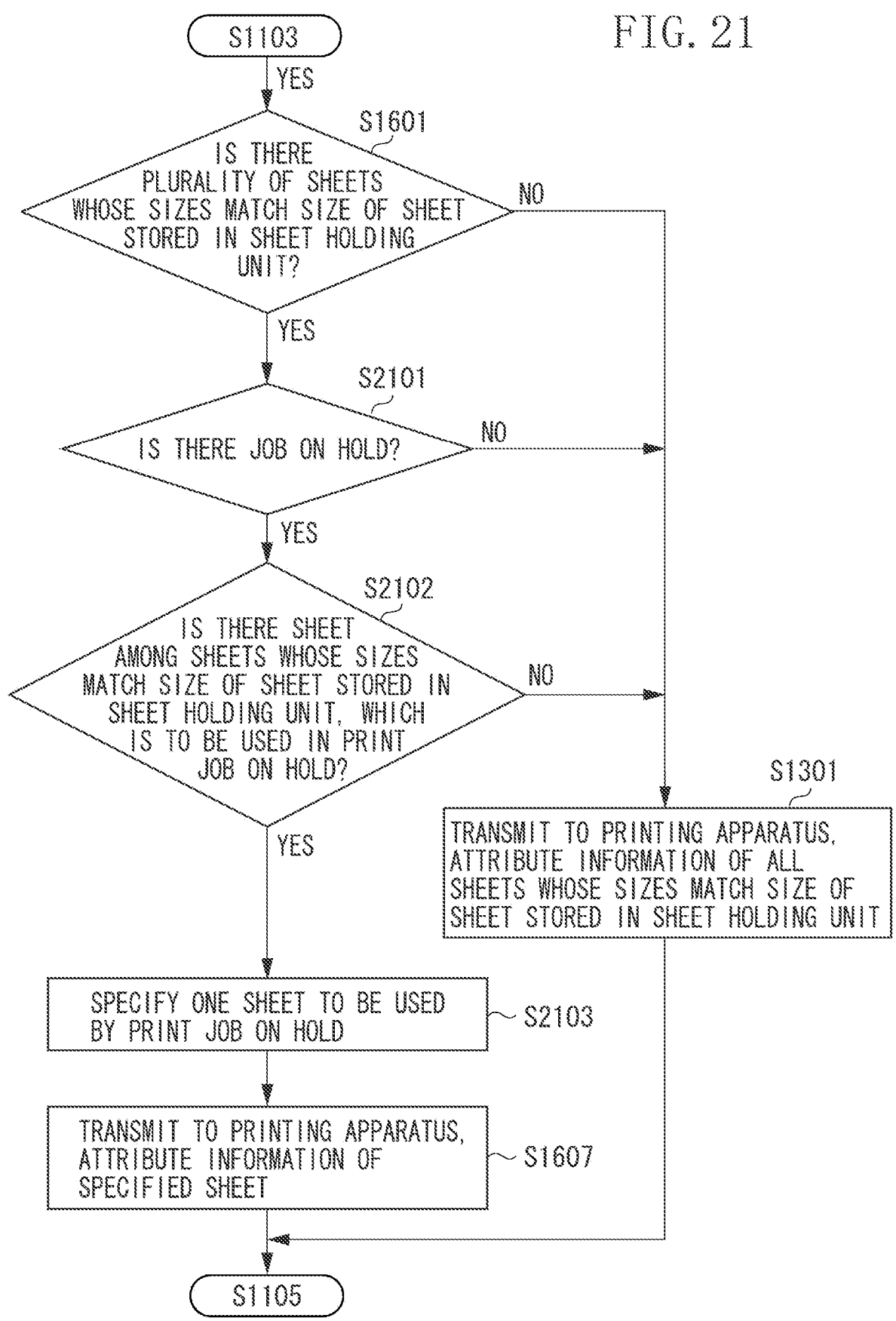
FIG. 21 is a flowchart illustrating in detail the process to be performed in step 1104 of the flowchart illustrated in FIG. 11 by the server according to a fourth exemplary embodiment of the present invention.

According to the fourth exemplary embodiment, the process performed in step S1104 of the flowchart illustrated in FIG. 11 is different from the process performed according to the first, second, and third exemplary embodiments. The process performed in step S1104 according to the fourth exemplary embodiment will be described in detail with reference to the flowchart illustrated in FIG. 21.

If the CPU 207 determines that there is a plurality of sheets whose size matches the size of the sheet stored in the sheet holding unit (YES in step S1601), the process proceeds to step S2101.

In step S2101, the CPU 207 determines whether there is a print job on hold in the HDD 205. If the CPU 207 determines that there is a print job on hold (YES in step S2101), the process proceeds to step S2102. On the other hand, if the CPU 207 determines that there is no print job on hold (NO in step S2101), the process proceeds to step S1301.

In step S2102, the CPU 207 determines whether there is a sheet to be used in the print job on hold among the plurality of sheets whose size matches the size of the sheet stored in the sheet holding unit. If the CPU 207 determines that there is the sheet to be used in the print job on hold (YES in step S2102), the process proceeds to step S2103. If the CPU 207 determines that there is no sheet to be used in the print job on hold (NO in step S2102), the process proceeds to step S1301. Since the processes of step S1301 and the subsequent steps are similar to those according to the first exemplary embodiment, description will be omitted.

In step S2103, the CPU 207 specifies one sheet to be used in the print job on hold from among the plurality of sheets whose size matches the size of the sheet stored in the sheet holding unit. The process then proceeds to step S1607. If there is a plurality of sheets to be used in the print job on hold among the plurality of sheets whose size matches the size of the sheet stored in the sheet holding unit, the sheet to be first fed in the print job on hold is preferentially specified Instead, the CPU 207 may transmit the candidates of the plurality of sheets to be used in the print job on hold among the plurality of sheets whose size matches the size of the sheet stored in the sheet holding unit, to the printing apparatus 102. The user may then specify the sheet by selecting one sheet from the candidate sheets on the operation unit 318 of the printing apparatus 102.

Since the processes of step S1607 and the subsequent steps are similar to those according to the second exemplary embodiment, description will be omitted.

The process for searching for the sheet registered in the sheet holding unit information storing unit 502 performed by the server 101 according to the fourth exemplary embodiment is as described above.

As described above, according to the fourth exemplary embodiment, if there is a plurality of sheets whose size matches the size of the sheet stored in the sheet holding unit, the attribute information of the sheet to be used by the print job on hold is preferentially stored as the setting values of the sheet holding unit. As a result, when the print job on hold is executed, it prevents the print job from becoming suspended for the reason that the attribute information of the sheet to be used in the print job on hold is not stored with respect to the sheet holding unit.

The present invention is not limited to the above-described exemplary embodiments, and various modifications (including organic combinations of the exemplary embodiments) may be realized based on the objective of the invention, and not excluded from the scope of the invention.

For example, according to the present invention, the size of the sheet is detected as one of the attribute information of the sheet stored in the sheet storing unit. However, a plurality of types of attribute information may be detected and transmitted instead of one. The subsequent processes may then be performed based on the plurality of types of attribute information.

Further, according to the present invention, the information transmitted to the server 101 is the size of the sheet stored in the sheet holding unit. However, the present invention is not limited thereto. For example, it is assumed that the sensor disposed in the sheet holding unit is capable of detecting the sheet color, grammage, and type, and the information on the sheet color, grammage, and type is also registered in the sheet information storing unit 501 and the sheet holding unit information storing unit 502. In such a case, the information on the sheet color, grammage, and type may also be transmitted to the server 101 along with the sheet size, and the sheet may be determined based on the sheet color, grammage, or type and the sheet size. Furthermore, only the information on the sheet color may be transmitted to the server 101 instead of the sheet size, and the sheet may be determined based on the sheet color.

In other words, if the attribute information including at least one of the sheet size, grammage, color, and type is obtained as the attribute information of the sheet stored in the sheet holding unit, the setting values including at least one of the attribute information other than the obtained attribute information can be set to the sheet holding unit.

According to the above-described exemplary embodiments, the printing apparatus 102 and the external server 101 are connected via the network 105. However, the present invention is not limited thereto, and the printing apparatus 102 and the server 101, i.e., a printing control apparatus included in the printing apparatus 102, may implement a portion or all of the above-described control. Further, a portion or all of the above-described control may be implemented by only the printing apparatus 102 without involving the processes performed on the server 101 side, i.e., the printing control apparatus. In other words, the server 101, i.e., the printing control apparatus, may be included in the printing apparatus 102 or the information processing apparatus 104. Further, a portion or all of the above-described control may be implemented by the printing apparatus 102 and the information processing apparatus 104 via the network 103 such as the LAN or the WAN, or the wireless LAN.

While the present invention has been described with reference to various examples and exemplary embodiments, the objective and the scope of the present invention are not limited by a specific description in the specification for a person skilled in the art.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus comprising:
a plurality of sheet holding units;
a detection unit configured to detect which sheet holding unit among the plurality of sheet holding units is closed;
a network interface configured to transmit, to a server, a sheet size set to the sheet holding unit which is detected, from among plural sheet holding units, as closed and to receive, from the server, plural pieces of attribute information corresponding to the transmitted sheet size as a response to the transmitted sheet size, wherein the plural pieces of attribute information is different from sheet size information and includes a parameter to control print processing by a printer engine;
a setting unit implemented by a processor and configured to set, to the detected sheet holding unit as attribute information of the sheet held in the detected sheet holding unit, attribute information received by the network interface;
a display configured to display the plural pieces of attribute information and to display attribute information received by the network interface;

an accepting unit configured to accept user's input to select attribute information from the plural pieces of attribute information; and a selecting unit implemented by the processor and configured to select attribute information from among the plural pieces of attribute information displayed by the display, wherein the setting unit sets, to the detected sheet holding unit and as attribute information of the sheet held in the detected sheet holding unit, the attribute information from among the displayed plural pieces of attribute information selected by the selecting unit, and wherein the set attribute information is used for printing an image on a sheet held in, and then conveyed from, the sheet holding unit which is detected by the detection unit as closed.

2. The printing apparatus according to claim 1,
wherein the setting unit sets attribute information to each of the plural sheet holding units, and
wherein, in a case where the printing apparatus executes the print processing, the printing apparatus executes the print processing according to sheet attribute information set to a sheet holding unit of the plural sheet holding units that feeds a sheet.

3. The printing apparatus according to claim 1, wherein the attribute information includes at least one of the following: sheet grammage, and a sheet type.

4. The printing apparatus according to claim 1, further comprising a user interface,
wherein the network interface transmits, to the server, a sheet size in accordance with an instruction received by the user interface.

5. The printing apparatus according to claim 1, wherein the detected sheet holding unit is configured to be opened and closed, the printing apparatus further comprising a close detecting unit configured to detect that the sheet holding unit detected by the detection unit as closed has been closed, and
wherein the network interface transmits, to the server, a sheet size in accordance with detection, by the close detecting unit, that the detected sheet holding unit has been closed.

6. The printing apparatus according to claim 1, wherein the network interface transmit, to the server, a sheet size in accordance with a sheet size having been set to the detected sheet holding unit.

7. The printing apparatus according to claim 1, further comprising a detection sensor configured to detect a sheet size of a sheet held in the detected sheet holding unit,
wherein the network interface transmits the sheet size detected by the detection sensor to the server.

8. The printing apparatus according to claim 1, wherein, in a case where a sheet size and another attribute information not to be used for the print processing is stored in the server in association with each other, the network interface is configured to receive, from the server, the another attribute information stored in association with the sheet size transmitted to the server.

9. The printing apparatus according to claim 1, further comprising a determining unit implemented by the processor and configured to determine a sheet size, of a sheet, currently set to the detected sheet holding unit,
wherein the network interface transmits, to the server, the sheet size determined by the determining unit.

10. A control method for a printing apparatus having a plurality of sheet holding units and a network interface, the control method comprising:

detecting which sheet holding unit among the plurality of sheet holding units is closed;

transmitting, to a server from the network interface, a sheet size set to the sheet holding unit which is detected, from among plural sheet holding units, as closed and receiving, from the server, plural pieces of attribute information corresponding to the transmitted sheet size as a response to the transmitted sheet size, wherein the plural pieces of attribute information is different from sheet size information and includes a parameter to control print processing by a printer engine;

setting, to the detected sheet holding unit as attribute information of the sheet held in the detected sheet holding unit, attribute information received by the network interface;

displaying the plural pieces of attribute information and displaying attribute information received by the network interface;

accepting user's input to select attribute information from the plural pieces of attribute information; and selecting attribute information from among the displayed plural pieces of attribute information, wherein setting includes setting, to the detected sheet holding unit and as attribute information of the sheet held in the detected sheet holding unit, the selected attribute information from among the displayed plural pieces of attribute information, and wherein the set attribute information is used for printing an image on a sheet held in, and then conveyed from, the sheet holding unit which is detected as closed.

11. The control method according to claim 10,
wherein setting includes setting attribute information to each of the plural sheet holding units, and
wherein, in a case where the printing apparatus executes the print processing, the printing apparatus executes the print processing according to sheet attribute information set to a sheet holding unit of the plural sheet holding units that feeds a sheet.

12. The control method according to claim 10, wherein the attribute information includes at least one of the following: sheet grammage, and a sheet type.

13. The control method according to claim 10, further comprising receiving an instruction via a user interface,
wherein the network interface transmits, to the server, a sheet size in accordance with an instruction received by the user interface.

14. The control method according to claim 10, wherein the detected sheet holding unit is configured to be opened and closed, the printing apparatus further comprising detecting that the sheet holding unit detected as closed has been closed, and
wherein the network interface transmits, to the server, a sheet size in accordance with detection that the detected sheet holding unit has been closed.

15. The control method according to claim 10, wherein the network interface transmit, to the server, a sheet size in accordance with a sheet size having been set to the detected sheet holding unit.

16. The control method according to claim 10, further comprising receiving, in a case where a sheet size and another attribute information not to be used for the print processing is stored in the server in association with each other, from the server by the network interface,
the another attribute information stored in association with the sheet size transmitted to the server.

17. The control method according to claim 10, further comprising determining a sheet size, of a sheet, currently set to the detected sheet holding unit,
    wherein the network interface transmits, to the server, the determined sheet size.

18. A non-transitory computer-readable storage medium storing a program to cause a printing apparatus having a plurality of sheet holding units and a network interface to perform a control method, the control method comprising:
    detecting which sheet holding unit among the plurality of sheet holding units is closed;
    transmitting, to a server from the network interface, a sheet size set to the sheet holding unit which is detected, from among plural sheet holding units, as closed and receiving, from the server, plural pieces of attribute information corresponding to the transmitted sheet size as a response to the transmitted sheet size, wherein the plural pieces of attribute information is different from sheet size information and includes a parameter to control print processing by a printer engine;
    setting, to the detected sheet holding unit as attribute information of the sheet held in the detected sheet holding unit, attribute information received by the network interface;
    displaying the plural pieces of attribute information and displaying attribute information received by the network interface;
    accepting user's input to select attribute information from the plural pieces of attribute information; and
    selecting attribute information from among the displayed plural pieces of attribute information,
    wherein setting includes setting, to the detected sheet holding unit and as attribute information of the sheet held in the detected sheet holding unit, the selected attribute information from among the displayed plural pieces of attribute information, and
    wherein the set attribute information is used for printing an image on a sheet held in, and then conveyed from, the sheet holding unit which is detected as closed.

* * * * *